US012710096B2

(12) United States Patent
Kito et al.

(10) Patent No.: US 12,710,096 B2
(45) Date of Patent: Aug. 18, 2026

(54) LUBRICANT LEAKAGE CONTROL MECHANISM AND GEAR MECHANISM

(71) Applicant: Nabtesco Corporation, Tokyo (JP)

(72) Inventors: Tetsuya Kito, Tokyo (JP); Masato Uchihara, Tokyo (JP); Taisuke Ishida, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 98 days.

(21) Appl. No.: 18/711,402

(22) PCT Filed: Nov. 18, 2022

(86) PCT No.: PCT/JP2022/042859
§ 371 (c)(1),
(2) Date: Nov. 18, 2024

(87) PCT Pub. No.: WO2023/119982
PCT Pub. Date: Jun. 29, 2023

(65) Prior Publication Data

US 2025/0189030 A1 Jun. 12, 2025

(30) Foreign Application Priority Data

Dec. 24, 2021 (JP) ................................ 2021-210764
Jun. 30, 2022 (JP) ................................ 2022-106001

(51) Int. Cl.
*F16C 33/78* (2006.01)
*B66C 23/84* (2006.01)
(Continued)

(52) U.S. Cl.
CPC ....... *F16H 57/029* (2013.01); *F16C 33/7886* (2013.01); *F16C 33/805* (2013.01); (Continued)

(58) Field of Classification Search
CPC ........ F16H 1/06; F16H 57/029; F16H 57/031; F16H 57/0423; F16H 2057/02078; (Continued)

(56) References Cited

U.S. PATENT DOCUMENTS 1,140,334 A * 5/1915 Farnum .................... F16H 1/06 74/414
4,566,351 A * 1/1986 Skipor ................. F16H 57/029 74/606 R
(Continued)

FOREIGN PATENT DOCUMENTS

CN 102797832 A 11/2012
CN 203641511 U 6/2014
(Continued)

OTHER PUBLICATIONS

Machine translation of JP 2010-31409 A obtained on Oct. 16, 2025.*
(Continued)

*Primary Examiner* — Adam D Rogers
(74) *Attorney, Agent, or Firm* — Pillsbury Winthrop Shaw Pittman, LLP

(57) ABSTRACT

A lubricant leakage control mechanism of an embodiment includes: an output block body disposed on at least one of two opposing surfaces of an annular gear in the thickness direction adjacent to external teeth of the annular gear in the thickness direction, the block body having an outer circumferential surface around the entire circumference of the gear; a cover provided over the entire circumference so as to face the external teeth in a radial direction, the cover covering the external teeth; and a felt sheet sealing between the output block body and the cover.

12 Claims, 20 Drawing Sheets

(51) Int. Cl.

| | |
|---|---|
| ***E02F 9/12*** | (2006.01) |
| ***F16C 33/80*** | (2006.01) |
| ***F16H 1/06*** | (2006.01) |
| ***F16H 57/02*** | (2012.01) |
| ***F16H 57/029*** | (2012.01) |
| ***F16H 57/031*** | (2012.01) |
| ***F16H 57/04*** | (2010.01) |

(52) U.S. Cl.
CPC ............. *F16H 1/06* (2013.01); *F16H 57/031* (2013.01); *B66C 23/84* (2013.01); *E02F 9/126* (2013.01); *F16C 2360/31* (2013.01); *F16H 2057/02078* (2013.01); *F16H 57/0423* (2013.01)

(58) Field of Classification Search
CPC ................ F16C 33/7886; F16C 33/805; F16C 2360/31; B66C 23/84; E02F 9/126
See application file for complete search history.

(56) References Cited

U.S. PATENT DOCUMENTS

| | | | | |
|---|---|---|---|---|
| 5,040,428 | A * | 8/1991 | Miyaoka | E02F 3/36<br>74/421 A |
| 5,566,592 | A * | 10/1996 | Adam | F16H 57/031<br>74/606 R |
| 9,109,579 | B2 * | 8/2015 | Lin | F16C 33/768 |
| 10,281,026 | B2 * | 5/2019 | DiSabatino | F16H 57/0423 |
| 10,837,538 | B2 * | 11/2020 | Suzuki | F16J 15/062 |
| 10,975,951 | B2 * | 4/2021 | Klaehn | H02K 11/21 |
| 11,754,166 | B2 * | 9/2023 | Kito | F16H 1/06<br>74/160 |
| 2004/0244521 | A1 | 12/2004 | Russ et al. | |
| 2017/0299062 | A1 * | 10/2017 | Blais | F16J 15/342 |
| 2019/0264796 | A1 | 8/2019 | Suzuki et al. | |

FOREIGN PATENT DOCUMENTS

| | | | | |
|---|---|---|---|---|
| CN | 204300313 | U | 4/2015 | |
| CN | 110735916 | A | 1/2020 | |
| FR | 3055687 | A1 * | 3/2018 | F16N 31/02 |
| JP | 56-21654 | U | 2/1981 | |
| JP | 6-49798 | U | 7/1994 | |
| JP | 11-344125 | A | 12/1999 | |
| JP | 2010-31409 | A | 2/2010 | |
| JP | 4563510 | B1 | 10/2010 | |
| JP | 2018-71656 | A | 5/2018 | |

OTHER PUBLICATIONS

International Search Report dated Jan. 10, 2023 issued in corresponding International Application No. PCT/JP2022/042859 with English translation (4 pgs.).
Notice of Reasons for Rejection dated Aug. 6, 2024, issued in corresponding Japanese Patent Application No. 2023-569176 with English translation (14 pgs.).
Extended European Search Report dated Nov. 7, 2025, issued in corresponding European Patent Application No. 22910700.8 (12 pgs.).

* cited by examiner

< RESULT SAMPLES >

INPUT FRAME 1

INPUT FRAME 2

(*BLACK CIRCLES IN IMAGES WERE ADDED AFTERWARDS TO EMPHASIZE SITE OF DIFFERENCE)

DIFFERENCE IN RED COMPONENT (*WHITE CIRCLE IN IMAGE WAS ADDED AFTERWARDS TO INDICATE SITE OF BLACK CIRCLE IN INPUT FRAME)

LUBRICANT LEAKAGE CONTROL MECHANISM AND GEAR MECHANISM

TECHNICAL FIELD

The present invention relates to a lubricant leakage control mechanism and a gear mechanism. This application is the U.S. National Phase of International Application No. PCT/IP2022/042859 (filed on Nov. 18, 2022), which is based on and claims the benefit of priority from Japanese Patent Application Serial Nos. 2021-210764 (filed on Dec. 24, 2021) and 2022-106001 (filed on Jun. 30, 2022), the contents of each of which are incorporated herein by reference in entirety.

BACKGROUND

Large bearings are used in construction machinery, wind turbines, and other equipment to freely support rotating members. These bearings can be, for example, rolling bearings, which each have an inner ring, outer ring, and rolling elements between the inner and outer rings. The bearings used in construction machinery, wind turbines, etc. are subjected to large loads. Thus, various technologies have been disclosed to prevent leakage of the lubricant that lubricates bearing sliding parts.

For example, a seal member is attached to both ends of rolling element holding surfaces that face the outer ring surface and inner ring surface with rolling elements interposed, and a space is provided between the seal members. In this feature, pressurized fluid is supplied to the space to press lips of the seal members against the mating walls to improve the sealing performance of the seal members. This prevents leakage of lubricant in the sliding parts of the bearing.

RELEVANT REFERENCE

List of Relevant Patent Literature

Patent Literature 1: Publication of Japanese Patent No. 4563510

SUMMARY

In some cases, the outer or inner ring of the bearing itself is used as the driving ring by integrally installing a gear in the bearing itself and meshing this gear with another gear such as a pinion gear to which power is inputted. In such cases, lubricant is often supplied to the meshing part between the gear in the bearing and other gears. It is desirable to control the leakage of this lubricant.

However, although the conventional technology described above can prevent leakage of lubricant in the sliding parts of bearings, it is difficult to control leakage of lubricant supplied to the meshing of gears in the vicinity of the gears. If the entire gear is covered with a cover and a sealing feature is installed there to prevent the leakage of lubricant at a position away from the gear, the size of the entire system is increased.

One object of the present invention is to provide a lubricant leakage control mechanism and a gear mechanism that can control leakage of lubricant used for meshing gears in the vicinity of the gears, thereby reducing the size of the system.

A lubricant leakage control mechanism according to one aspect of the invention includes: a gear; a block body disposed on at least one of two opposing surfaces of the gear in the thickness direction adjacent to teeth of the gear in the thickness direction, the block body having an outer circumferential surface around the entire circumference; a cover provided around an entire circumference of the gear so as to face the teeth in a radial direction of the gear, the cover covering the teeth of the gear; and a sealing member sealing between the block body and the cover.

Thus, the sealing member seals between the block body, which is provided alongside the gear teeth, and the cover that covers the teeth. In this way, leakage of the lubricant supplied to the meshing of gears in the vicinity of the gears can be controlled, thereby reducing the size of the equipment.

In the above configuration, the sealing member may be formed of a porous material that is compressible and deformable.

In the above configuration, the cover has a cover overhang projecting from the cover toward the teeth, and the sealing member is disposed between the cover overhang and the block body.

In the above configuration, the block body may have a block body overhang projecting from the circumferential surface toward the cover, and the sealing member may be disposed between the block body overhang and the cover.

In the above configuration, the cover may have a cover overhang projecting from the cover toward the teeth, and the block body may have a block body overhang projecting from the circumferential surface toward the cover, and he sealing member may be held in the thickness direction by the cover overhang and the block body overhang.

In the above configuration, the cover may include: a cover overhang projecting from the cover toward the teeth; and an auxiliary cover provided at a position more distant from the gear in the thickness direction than the cover overhang. The auxiliary cover may hold the sealing member together with the cover overhang in the thickness direction.

In the above configuration, the sealing member may be disposed between the cover overhang and the circumferential surface of the block body.

In the above configuration, the sealing member may be in surface contact with the block body and the cover.

In the above configuration, further included is a pressing portion locally pressing the sealing member.

In the above configuration, the pressing portion may be formed continuously or discontinuously in the circumferential direction of the gear.

In the above configuration, the pressing portion is formed on at least one of the block body or the cover, and the pressing portion pressing the sealing member in the radial or axial direction of the gear.

In the above configuration, the pressing portion may be formed to be convex or concave in the direction of pressing the sealing member.

In the above configuration, the pressing portion is formed to be convex or concave in the direction of pressing the sealing member, and a top of the pressing portion may be rounded.

In the above configuration, the pressing portion may be formed so that a distance between the opposing surfaces of the block body and the cover is decreased.

A lubricant leakage control mechanism according to another aspect of the invention includes: a gear having teeth on its outer circumferential surface; a block body disposed on at least one of two opposing surfaces of the gear in the thickness direction adjacent to the teeth of the gear in the thickness direction, the block body having an outer circumferential surface around the entire circumference; a cover covering the teeth from a radially outer side; and a sealing member sealing between the block body and the cover. The cover has a cover overhang projecting from the cover toward a radially inner side, and the block body has a block body overhang projecting from the outer circumferential surface toward the radially outer side. The sealing member is held in the thickness direction by the cover overhang and the block body overhang.

Thus, the sealing member seals between the block body, which is provided alongside the gear teeth, and the cover that covers the teeth. In this way, leakage of the lubricant supplied to the meshing of gears in the vicinity of the gears can be controlled. The gap between the cover and block body can be decreased by the cover overhang and block body overhang provided therein. Furthermore, by holding the seal member in the thickness direction of the gear, the radial size of the lubricant leakage control mechanism can be made smaller and the seal member can be made thinner. This makes it possible to downsize the lubricant leakage control mechanism.

A lubricant leakage control mechanism according to yet another aspect of the invention includes: a block body disposed on at least one of two opposing surfaces of the gear with teeth on the outer circumferential surface in the thickness direction, the block body having an outer circumferential surface around the entire circumference adjacent to the teeth of the gear in the thickness direction; a cover covering the teeth from a radially outer side; and a sealing member sealing between the block body and the cover. The cover includes: a cover overhang projecting from the cover toward a radially inner side; and an auxiliary cover provided at a position more distant from the gear in the thickness direction than the cover overhang. The block body has a block body overhang projecting from the outer circumferential surface toward the radially outer side. The sealing member is held in the thickness direction by the cover overhang and the block body overhang, the sealing member is also held in the thickness direction by the cover overhang and the auxiliary cover between the cover and the block body overhang. The sealing member is disposed between the cover overhang and the outer circumferential surface of the block body.

The sealing member is held in the thickness direction by the cover overhang and the block body overhang, the sealing member is also held in the thickness direction by the cover overhang and the auxiliary cover between the cover and the block body overhang. This prevents the sealing member itself from rotating against the cover and block body while preventing leakage of the lubricant supplied to the meshing of the gears in the immediate vicinity of the gears. The auxiliary cover prevents dust from entering the cover from the outside.

A gear mechanism according to another aspect of the invention includes: an annular gear integrated with an outer ring of a bearing, the annular gear having teeth on its outer circumference; a block body disposed on a surface of the gear in the thickness direction adjacent to the teeth in the thickness direction, the block body having an outer circumferential surface around the entire circumference; a cover covering the teeth from a radially outer side; and a sealing member sealing between the block body and the cover. The cover has a cover overhang projecting from the cover toward a radially inner side, and the block body has a block body overhang projecting from the circumferential surface toward the cover. The sealing member is held in the thickness direction by the cover overhang and the block body overhang.

Thus, the sealing member seals between the block body, which is provided alongside the teeth of the annular gear, and the cover that covers the teeth. In this way, leakage of the lubricant supplied to the meshing of gears in the vicinity of the annular gear can be controlled. The gap between the cover and block body can be decreased by the cover overhang and block body overhang provided therein. Furthermore, by holding the seal member in the thickness direction of the gear, the radial size of the lubricant leakage control mechanism can be made smaller and the seal member can be made thinner. This makes it possible to downsize the gear mechanism.

A gear mechanism according to another aspect of the invention includes: an annular gear integrated with an outer ring of a bearing, the annular gear having teeth on its outer circumference; a block body disposed on at least one of two opposing surfaces of the gear in the thickness direction adjacent to the teeth of the gear in the thickness direction, the block body having an outer circumferential surface around the entire circumference; a cover covering the teeth from a radially outer side; and a sealing member sealing between the block body and the cover. The cover has a cover overhang projecting from the cover toward a radially inner side, and an auxiliary cover provided at a position more distant from the gear in the thickness direction than the cover overhang. The block body has a block body overhang projecting from the circumferential surface toward the cover. The sealing member is held in the thickness direction by the cover overhang and the block body overhang, the sealing member is also held in the thickness direction by the cover overhang and the auxiliary cover between the cover and the block body overhang. The sealing member is disposed between the cover overhang and the outer circumferential surface of the block body.

This prevents the sealing member itself from rotating against the cover and block body while preventing leakage of the lubricant supplied to the meshing of the gears in the immediate vicinity of the gears. The auxiliary cover prevents dust from entering the cover from the outside.

Advantageous Effects

With the above-described lubricant leakage control mechanism and gear mechanism, leakage of the lubricant supplied to the meshing of gears in the vicinity of the gears can be controlled, thereby reducing the size of the equipment.

DESCRIPTION OF THE EMBODIMENTS

The embodiments of the present invention will be hereinafter described with reference to the drawings.

First Embodiment

<Positioner>

Figure 1:
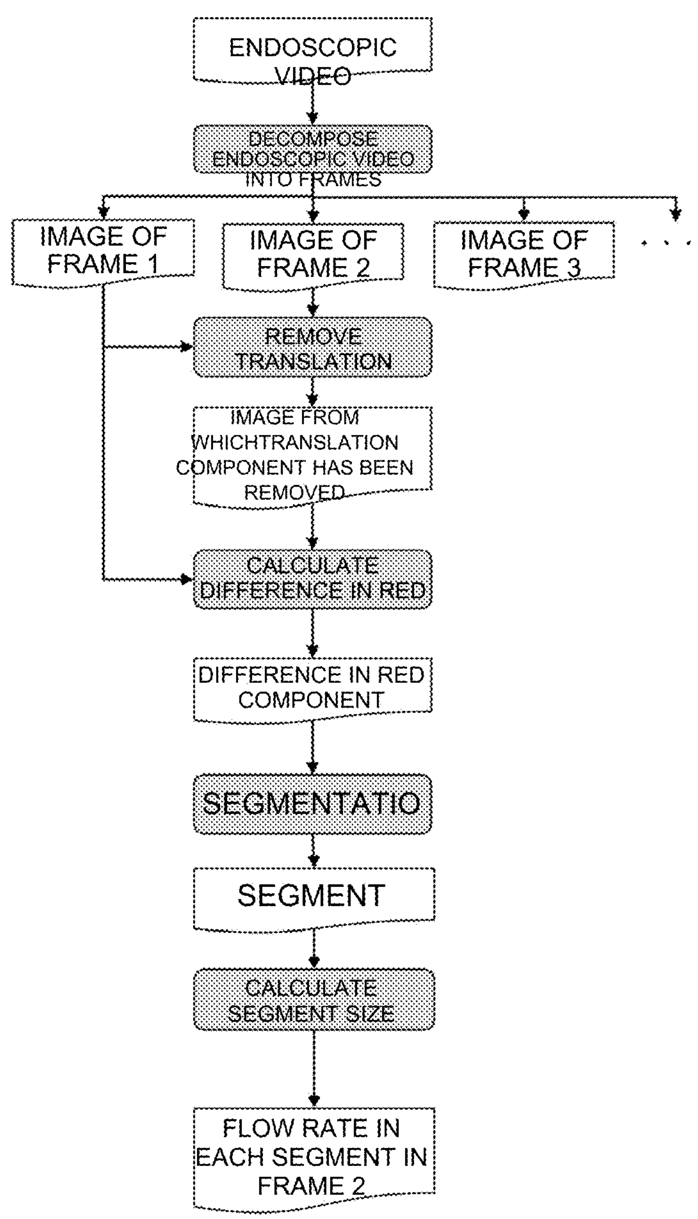
FIG. 1 is a perspective view of a positioner in a first embodiment of the invention.
Figure 1:
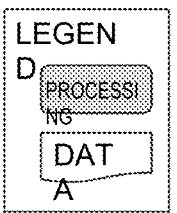
Figure 2:
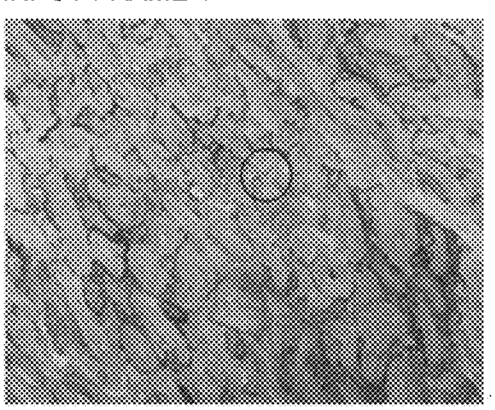
FIG. 2 is a sectional view of FIG. 1 along the line A-A.
Figure 2:
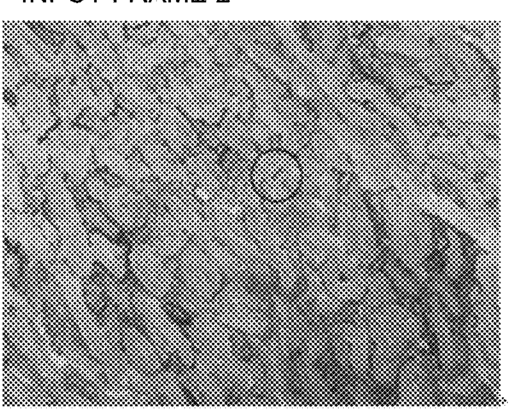

FIG. 1 is a perspective view of a positioner 100, which is a gear mechanism equipped with a lubricant leakage control mechanism 1. FIG. 2 is a sectional view of FIG. 1 along the line A-A. The positioner 100 is used, for example, in construction and industrial machinery not shown. The positioner 100 is for adjusting the direction of a rotating body attached to the positioner 100, which is not shown.

As shown in FIGS. 1 and 2, the positioner 100 includes a plate-shaped base 2, a bearing 3 attached to the base 2, an annular gear 4 (ring gear, an example of a gear in the claims) integrally installed on an outer circumference of the bearing 3, a lubricant leakage control mechanism 1 (hereinafter simply called the leakage control mechanism) installed in the vicinity of the annular gear 4, and an input unit 5 transmitting power to the annular gear 4. In the following description, unless otherwise specified, the direction of the rotation axis L of the annular gear 4 is simply referred to as an axial direction, the radial direction of the annular gear 4 as a radial direction, and the circumferential direction of the annular gear 4 as a circumferential direction.

The base 2 has an annular bearing mounting portion 6, viewed from the thickness direction of the base 2, and an input unit mounting portion 7 integrally formed on one side of the bearing mounting portion 6. The bearing 3 is attached to the bearing mounting portion 6. The input unit 5 is attached to the input unit mounting portion 7.

<Bearing>

The bearing 3 can be, for example, a rolling bearing, which includes an inner ring 8, outer ring 9, and rolling elements 10 disposed between the inner ring 8 and outer ring 9. The inner diameter of the inner ring 8 is substantially the same as that of the bearing mounting portion 6. The inner ring 8 has a plurality of bolt holes, not shown, penetrating in the axial direction. The bearing mounting portion 6 has female threads, not shown, at a position corresponding to the bolt holes in the inner ring 8. The inner ring 8 is fixed to the bearing mounting portion 6 by inserting the bolts 11 into the bolt holes from above the inner ring 8 and tightening these bolts 11 to the female threads of the bearing mounting portion 6. Various rolling elements having different shapes can be used, such as spherical, cylindrical, and conical rolling elements.

The outer ring 9 is slightly displaced in the direction away from a surface 6*a* of the bearing mounting portion 6 relative to the inner ring 8. In other words, a slight gap S is formed between the outer ring 9 and the bearing mounting portion 6. Due to this displacement of the outer ring 9 from the inner ring 8, a surface 9*a* of the outer ring 9 that faces away from the bearing mounting portion 6 protrudes from the inner ring 8 toward the side opposite the bearing mounting portion 6. On the surface 9*a* of the outer ring 9 protruding from the inner ring 8, an annular first seal portion 12 is provided on an inner circumferential surface 9*b*. A surface 8*a* of the inner ring 8 placed on the surface 6*a* of the bearing mounting portion 6 protrudes from the outer ring 9 toward the bearing mounting portion 6. On the one surface 8*a* of the inner ring 8 protruding from the outer ring 9, an annular second seal portion 13 is provided on an outer circumferential surface 8*b*.

These seal portions 12 and 13 seal between the inner ring 8 and outer ring 9. This prevents leakage of lubricant (not shown) around the rolling elements 10 (bearing sliding parts) of the bearing 3. The annular gear 4 is integrally installed on the outer circumferential surface of the outer ring 9. The annular gear 4 has external teeth 4*a*. The leakage control mechanism 1 is provided such that it encloses the annular gear 4.

<Leakage Control Mechanism>

Figure 3:
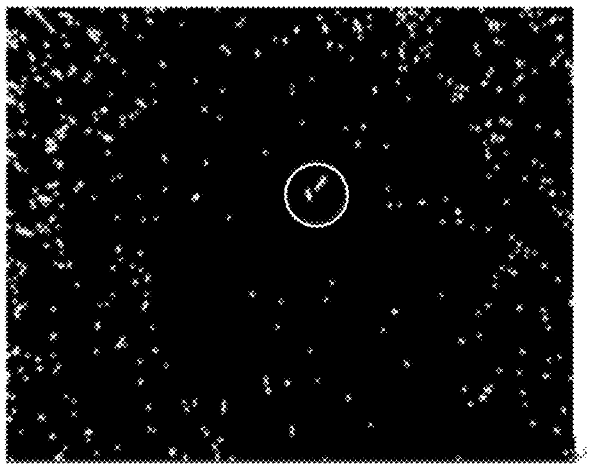
FIG. 3 is an enlarged sectional perspective view of a lubricant leakage control mechanism in the first embodiment of the invention.

FIG. 3 is an enlarged sectional perspective view of the leakage control mechanism 1. As shown in FIGS. 2 and 3, the leakage control mechanism 1 includes an annular output block body 14 (an example of a block body in the claims) provided on the surface 9*a* of the outer ring 9 (annular gear 4), a cover 15 covering the annular gear 4 and the output unit, and a felt sheet 16 (an example of a sealing member or porous material in the claims) that seals between the output block body 14 and the cover 15.

The output block body 14 is formed in a rectangular shape having the radial section with a longer side in the radial direction. A lower surface 14*a* of the output block body 14 facing the outer ring 9 is placed on the surface 9*a* of the outer ring 9. An alignment convex portion 17 is integrally formed on an inner surface 14*c* of the output block body 14. A lower end 17*a* of the alignment convex portion 17 on the outer ring 9 side is projected slightly from the output block body in the axial direction 14 toward the inner circumferential surface 9*b* of the outer ring 9.

The inner circumferential surface 9*b* of the outer ring 9 butts against the outer circumferential surface of the alignment convex portion 17 on the lower end 17*a* side to align the output block body 14 with respect to the outer ring 9. The position of an upper end 17*b* of the alignment convex portion 17, which is opposite the lower end 17*a*, is situated closer to the outer ring 9 than the upper surface 14*b*, which is opposite the lower surface 14*a* of the output block body 14, is. Therefore, a step is formed between the upper surface 14*b* of the output block body 14 and the alignment convex portion 17.

The output block body 14 has a plurality of bolt holes 19 penetrating in the axial direction. The bolt holes 19 are arranged at intervals in the circumferential direction. The outer ring 9 of the bearing 3 has female threads, not shown, at a position corresponding to the bolt holes 19. Bolts 20 are inserted into the corresponding bolt holes 19 from the top of the output block body 14. By tightening the bolts 20 in the female threads of the outer ring 9, the output block body 14 is fixed to the outer ring 9.

Attachment holes 24 are formed in the upper surface 14*b* of the output block body 14. The attachment holes 24 are each formed between two adjacent bolt holes 19 in the circumferential direction in the upper surface 14*b* of the output block body 14. The attachment holes 24 are used to attach a rotating element (mating member), not shown, to the output block body 14. The attachment holes 24 are, for example, female threads. To attach the rotating element (mating member) to the upper surface 14*b* of the output block body 14, the female threads, not shown, formed in the outer ring 9 and the bolt hole 19 in the output block body 14 leading to these female threads may be used. The rotating element (mating member) may be fastened to the upper surface 14*b* of the output block body 14 by other bolts different from the bolts 20. An output outer flange 18 (an example of a block body overhang in the claim) is integrally formed on an outer circumferential surface 14*d* of the output block body 14. The output outer flange 18 extending radially outward is provided at the position closer to the upper surface 14*b* rather than the center of the output block body 14 in the axial direction. The outer diameter of the output outer flange 18 is slightly smaller than the tooth tip diameter of the annular gear 4.

The cover 15 has a cylindrical cover body 31 that covers the annular gear 4 from the outside in the radial direction, and an output unit cover portion 32 integrally formed on one side of the cover body 31. At a lower end 31*a* of the cover body 31 facing the bearing mounting portion 6, a cover outer flange 21 that extends outward in the radial direction is formed by bending. This cover outer flange 21 is secured to the bearing mounting portion 6 by bolts 22. In this way, the cover body 31 is fixed to the bearing mounting portion 6. The upper end 31*b* opposite the lower end 31*a* of the cover body 31 overlaps positionally with the output outer flange 18 when viewed in the radial direction.

A cover inner flange 23 (an example of a cover overhang in the claim) is integrally formed slightly below the upper end 31*b* of the cover body 31. The cover inner flange 23 projects inwardly in the radial direction. The cover inner flange 23 is joined to the cover body 31 by welding, for example. Below the output outer flange 18, the cover inner flange 23 extends to slightly before the outer circumference surface 14*d* of the output block body 14. In this manner, the cover inner flange 23 and the output outer flange 18 oppose each other in the axial direction.

A felt sheet 16 is provided to be sandwiched between the cover inner flange 23 and the output outer flange 18, which are opposed in the axial direction. The felt sheet 16 is a porous material that can be compressed and deformed. The felt sheet 16 is slightly compressed and deformed in the axial direction by the cover inner flange 23 and the output outer flange 18. This ensures sealing between the output block body 14 and the cover body 31. The upper surface 16*a* of the felt sheet 16 between the cover body 31 and the output outer flange 18 is exposed to the outside.

The felt sheet 16 is simply held between the cover inner flange 23 and the output outer flange 18, so the output outer flange 18 is slidable against the felt sheet 16. The cover body 31 is disposed on the radially outer side of the felt sheet 16. On the radially inner side of the felt sheet 16, the outer circumferential surface 14*d* of the output block body 14 is situated. The cover body 31 and the outer circumferential surface 14*d* of the output block body 14 prevents the felt sheet 16 from moving in the radial direction.

<Output Unit>

As shown in FIGS. 1 and 2, the output unit 5 includes a speed reducer 25 mounted on the other surface 7*b* of the output unit mounting portion 7 of the base 2 opposite the bearing 3, a motor unit 26 disposed on the side of the speed reducer 25 facing away from the output unit mounting portion 7, and a small gear 27 disposed on an output shaft (not shown) of the speed reducer 25.

The speed reducer 25 reduces the rotation inputted by the motor 25 and outputs the reduced rotation. The speed reducer 25 may be, for example, a so-called eccentric oscillating speed reducer that includes: crankshafts to be driven by the rotation of the motor 26 inputted thereto; and an external gear configured to oscillatorily rotate as the crankshafts rotate (the crankshafts and external gear are both not shown). The eccentric oscillating speed reducer can output rotation slower than the rotation of the motor 26 as its external gear oscillatorily rotates.

This rotation is transmitted to the small gear 27. The small gear 27 is disposed on the surface 7*a* of the output unit mounting portion 7, which is in the same plane as the surface 6*a* of the bearing mounting portion 6. The output shaft of the speed reducer 25 protrudes through an aperture (not shown) formed in the output unit mounting portion 7 toward the surface 7*a* of the output unit mounting portion 7. The small gear 27 is fixed to this protruding output shaft. As a result, the small gear 27 is rotated in conjunction with the output shaft of the speed reducer 25. In other words, the output rotation of the output shaft is transmitted to the small gear 27.

The small gear 27 has external teeth 27*a*. The external teeth 27*a* mesh with the external teeth 4*a* of the annular gear 4. The output unit cover portion 32 of the cover 15 is formed to cover the small gear 27 from the outer side. The part of the cover body 31 where the output unit cover portion 32 is formed has an opening. Therefore, the meshing between the annular gear 4 and the small gear 27 is not obstructed by the cover 15.

<Operation of Positioner and Action of Leakage Control Mechanism>

The operation of the positioner 100 and the action of the leakage control mechanism 1 will be now described. When the output unit 5 is driven to rotate the small gear 27, the annular gear 4 meshing with the small gear 27 is rotated. Since the annular gear 4 is integrated with the outer ring 9 of bearing 3, the annular gear 4 and the outer ring 9 rotate together. The output block body 14 attached to the outer ring 9 rotates in conjunction with the outer ring 9. This adjusts the direction of the rotating element, not shown, which is attached to the output block body 14.

The output block body 14 is rotated relative to the cover body 31, which is fixed to the base 2 (bearing mounting portion 6). The felt sheet 16 between the cover inner flange 23 of the cover body 31 and the output outer flange 18 of the output block body 14 is simply held between the cover inner flange 23 and the output outer flange 18. Therefore, the cover inner flange 23 and the output outer flange 18 are slidable against the felt sheet 16.

When the flanges slide, the felt sheet 16 remains slightly compressed and held by the cover inner flange 23 and the output outer flange 18. In other words, the cover body 31 and the outer circumferential surface 14*d* of the output block body 14 prevents the felt sheet 16 from moving in the radial direction. As a result, sealing between the cover inner flange 23 (cover 15) and the output outer flange 18 (output block body 14) is maintained.

Grease or other lubricant is used to lubricate the meshing of the annular gear 4 and the small gear 27. The lubricant is applied to the entire external teeth 4*a* of the annular gear 4 and the entire external teeth 27*a* of the small gear 27. The entire circumference of the annular gear 4 is enclosed by the cover body 31 of the cover 15. The leakage control mechanism 1 seals between this cover body 31 and the output block body 14 directly above the annular gear 4 (surface 9*a* of the outer ring 9). This prevents the lubricant used for the meshing of the annular gear 4 with the small gear 27 from leaking out from around the annular gear 4.

In the first embodiment described above, provided are the output block body 14 disposed on the surface of the annular gear 4 (the surface 9*a* of the outer ring 9) and having the outer circumferential surface 14*d*, the cover 15 enclosing the entire circumference of the annular gear 4 so that it faces the outer gear teeth 4*a* in the radial direction and covering the annular gear 4 from the radially outer side, and the felt sheet 16 sealing between the output block body 14 and the cover 15. This configuration can prevent leakage of the lubricant used for the meshing of the small gear 27 with the annular gear 4 in the immediate vicinity (directly above) of the annular gear 4. Since the leakage of the lubricant can be controlled in the immediate vicinity of the annular gear 4, the size of the positioner 100 itself will not be increased.

The felt sheet 16, a porous material that can be compressed and deformed, is used as the sealing member to seal between the output block body 14 and the cover 15. Therefore, the sealing member can be manufactured at low cost. The sealing member can be easily made thinner. Thus the space between the cover inner flange 23 and the output outer flange 18 can be made as small as possible. This prevents the size of the positioner 100 from becoming larger in the axial direction.

The cover body 31 is provided with the cover inner flange 23 and the output block body 14 is provided with the output outer flange 18. By providing the felt sheet 16 between the cover inner flange 23 and output outer flange 18, the cover 15 and output block body 14 are sealed. Thus, the gap between the cover 15 and the output block body 14 can be narrowed by providing the cover inner flange 23 and the output outer flange 18. Therefore, the sealing member (felt sheet 16) can be made smaller and simpler. The leakage control mechanism 1 can also be made smaller.

Moreover, the cover inner flange 23 and the output outer flange 18 face each other in the axial direction. The felt sheet 16 is held between the cover inner flange 23 and the output outer flange 18 in the axial direction (in the thickness direction of the annular gear 4 (outer ring 9)). With this configuration, the leakage control mechanism 1 can be made smaller in the radial direction than when the cover inner flange 23 and the output outer flange 18 face each other in the radial direction.

For example, when the felt sheet 16 is held in the radial direction by the cover inner flange 23 and the output outer flange 18, it is necessary to prevent the felt sheet 16 from moving (slipping out) in the axial direction. For this purpose, a separate structure is needed to prevent the felt sheet 16 from slipping out in the axial direction. When the felt sheet 16 is held between the cover inner flange 23 and the output outer flange 18 in the axial direction, it is necessary to prevent the felt sheet 16 from moving (slipping out) in the radial direction. In this regard, the cover body 31 and the outer surface 14*d* of the output block body 14 can restrict the movement of the felt sheet 16 in the radial direction. Thus, the structure of the leakage control mechanism 1 can be simplified by holding the felt sheet 16 between the cover inner flange 23 and the output outer flange 18 in the axial direction.

Second Embodiment

Figure 4:
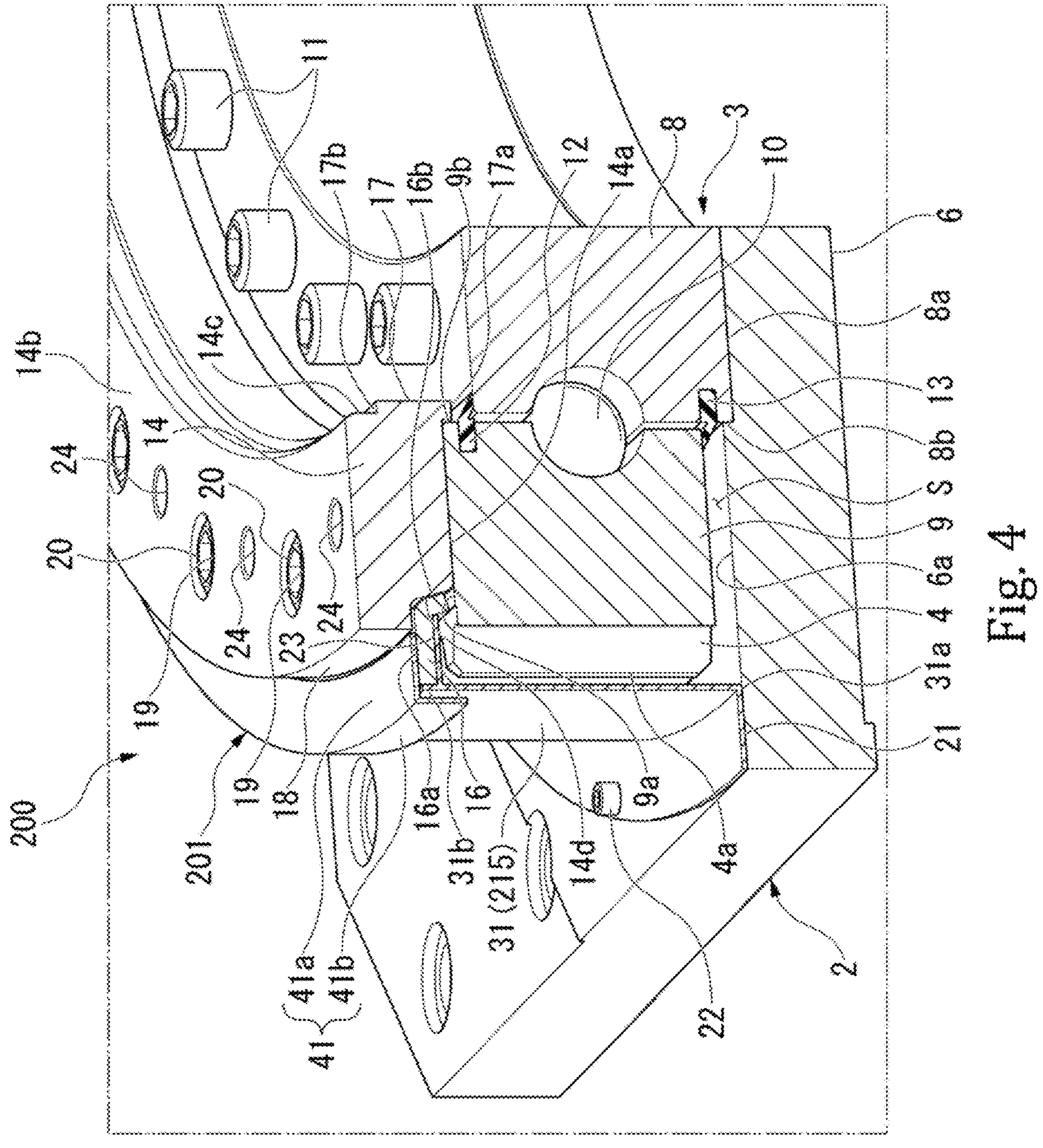
FIG. 4 is an enlarged sectional perspective view of a lubricant leakage control mechanism in a second embodiment of the invention.

The following now describes a second embodiment of the present invention with reference to FIG. 4. In the following description, the same elements and components as in the first embodiment will be denoted by the same reference numerals and detailed descriptions thereof will be omitted (this also applies to the embodiments described further below). FIG. 4 is an enlarged sectional perspective view of a lubricant leakage control mechanism 201 in the second embodiment of the invention. As shown in FIG. 4, a positioner 200 includes the plate-shaped base 2, the bearing 3 attached to the base 2, the annular gear 4 (ring gear, an example of a gear in the claims) integrally installed on the outer circumferential surface of the bearing 3, a lubricant leakage control mechanism 201 (hereinafter simply called the leakage control mechanism) installed in the vicinity of the annular gear 4, and the input unit 5 transmitting power to the annular gear 4. This configuration is same as that of the first embodiment (this also applies to the embodiments described further below).

<Leakage Control Mechanism>

The difference between the first and second embodiments described above is that the leakage control mechanism 1 of the first embodiment differs from the leakage control mechanism 201 of the second embodiment. Specifically, a cover 215 of the leakage control mechanism 201 has an auxiliary cover 41 that covers from above the upper surface 16*a* of the felt sheet 16, which is exposed externally between the cover body 31 and the output outer flange 18. The auxiliary cover 41 has L-shaped sections along the axial and radial directions. That is, the auxiliary cover 41 has a transverse wall (cover inner upper flange) 41*a* that covers the felt sheet 16 from above, and a longitudinal wall 41*b* that is bent and extended from the radially outer edge of the transverse wall 41*a* toward the base 2 along the axial direction.

The transverse wall 41*a* has an annular shape, viewed from the axial direction. The transverse wall 41*a* extends from the outer circumference of the output outer flange 18 and it protrudes slightly from the outside of the cover body 31 in the radial direction. The longitudinal wall 41*b* covers the periphery of the upper end 31*b* of the cover body 31 from the outside in the radial direction. In the second embodiment, the position of the upper end 31*b* of the cover body 31 in the height direction is substantially the same as the upper surface 16*a* of the felt sheet 16. Therefore, the felt sheet 16 is not only held in the axial direction by the cover inner flange 23 and the output outer flange 18. The felt sheet 16 is also held in the axial direction by the cover inner flange 23 and the transverse wall 41*a* of the auxiliary cover 41.

The outer diameter of the outer circumferential surface 14*d* of the output block body 14 (the outer circumferential surface of the output block body 14 on the outer ring 9 side of the bearing 3 rather than the output outer flange 18 side) decreases gradually toward the outer ring 9 in the axial direction. In other words, the outer circumferential surface 14*d* of the output block body 14 is inclined (tapered) so that it tapers toward the outer ring 9.

An inner circumferential portion 16*b* of the felt sheet 16 extends along the outer circumferential surface 14*d* of the output block body 14 to the surface 9*a* of the outer ring 9. In other words, the inner circumferential portion 16*b* of the felt sheet 16 is bent by the outer circumferential surface 14*d* of the output block body 14 toward the outer ring 9, using the inner edge of the cover inner flange 23 as a pivot point. The inner circumferential portion 16*b* of the felt sheet 16 is pressed by the outer circumferential surface 14*d* of the output block body 14 to be disposed in the gap between the cover inner flange 23 and the outer circumferential surface 14*d* of the output block body 14.

The above-described second embodiment can produce the same advantageous effects as does the first embodiment. In addition, the felt sheet 16 is not only held axially by the cover inner flange 23 and the output outer flange 18. The felt sheet 16 is also held in the axial direction by the cover inner flange 23 and the transverse wall 41*a* of the auxiliary cover 41. This prevents the felt sheet 16 itself from being rotated against the cover body 31 and output block body 14 (output outer flange 18). The upper surface 16*a* of the felt sheet 16 is completely covered by the transverse wall 41*a*. This more reliably prevents leakage of the lubricant used for the meshing of the small gear 27 with the annular gear 4 in the immediate vicinity (directly above) of the annular gear 4, and also prevents dust from entering inside the cover 15 from the outside.

The outer circumferential surface 14*d* of the output block body 14 is inclined (tapered) so that it tapers toward the outer ring 9. The inner circumferential portion 16*b* of the felt sheet 16 is pressed by the outer circumferential surface 14*d* of the output block body 14 to be disposed in the gap between the cover inner flange 23 and the outer circumferential surface 14*d* of the output block body 14. This further improves the sealing between the cover 15 (cover body 31) and the output block body 14.

In the second embodiment described above, the cover 215 has the auxiliary cover 41 as a separate unit. However, the embodiment is not limited to this, and the cover 215 and auxiliary cover 41 may be formed integrally as a single unit.

Third Embodiment

Figure 5:
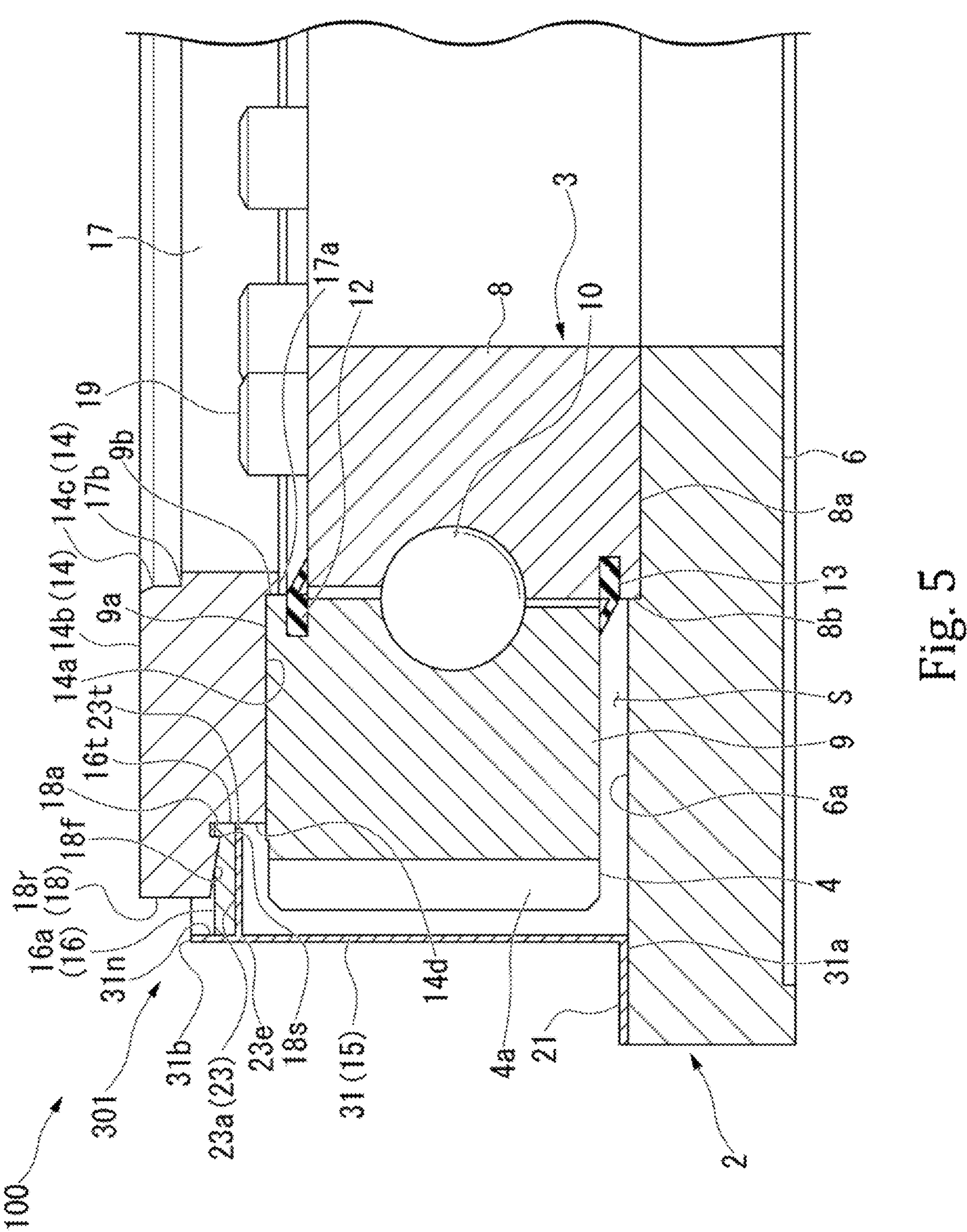
FIG. 5 is an enlarged sectional perspective view of a lubricant leakage control mechanism in a third embodiment of the invention.

The third embodiment of the lubricant leakage control mechanism and gear mechanism will now be described with reference to FIG. 5. FIG. 5 is an enlarged sectional view of a positioner, which is a gear mechanism equipped with a lubricant leakage control mechanism 301 relating to the third embodiment. The third embodiment differs from the first embodiment described above in that it relates to a pressing portion (the same applies to the fourth through eleventh embodiments below).

<Leakage Control Mechanism>

The leakage control mechanism 301 is formed with a protrusion 18*s* as the pressing portion, as shown in FIG. 5. The pressing portion enhances the sealing between the output block body 14 and the cover 15. Between the output block body 14 and the cover 15, the pressing portion locally presses and compresses the felt sheet 16, which is in surface contact with the output block body 14 and the cover 15. The term "surface contact" herein means that the contact points are not a single local point or a line of contact points, but rather that the surfaces of the elements are in contact with each other in a plane. For example, in the third embodiment, the surface of the output block body 14 and the surface of the felt sheet 16 opposing the output block body 14 wholly contact with each other. The surface of the inner cover flange 23 of the cover 15 and the surface of the felt sheet 16 wholly contact with each other.

The felt sheet 16 seals between the output block body 14 and the cover 15 so that the lubricant used for the annular gear 4 does not leak through the felt sheet 16 to the outside. The felt sheet 16 is held between the output outer flange 18 and the cover inner flange 23, which are in surface contact with each other. The felt sheet 16 is pressed from the lower surface 18*a* of the output outer flange 18 and the upper surface 23*a* of the cover inner flange 23 at the portion where the felt sheet 16 is in surface contact with these surfaces. The felt sheet 16 is pressed in the axial direction by them. Thus, when compressed, the felt sheet 16, which is a porous material that can be compressed and deformed, exhibits sealing properties to prevent the lubricant from leaking outward.

In the first embodiment of FIG. 3, the axial distance between the output outer flange 18 and the cover inner flange 23 is approximately equal over the entire length in the circumferential and radial directions at their opposing positions shown in the vertical direction of FIG. 3. Whereas in the third embodiment, the axial distance is smaller at the protrusion 18*s* in the portion where the output outer flange 18 and the cover inner flange 23 are in surface contact with the felt sheet 16. In other words, within the region of the surface contact with the felt sheet 16, the protrusion 18*s* as the pressing portion presses the felt sheet 16 so that the felt sheet is compressed locally more strongly than the other portions of the felt sheet. The protrusion 18*s* compresses the felt sheet 16 more strongly by locally applying a compression force Pq1, which will be described with reference to FIG. 13, in the axial thickness direction.

The part of the felt sheet 16 in contact with the protrusion 18*s* is pressed more strongly than the rest of the felt sheet. The part of the felt sheet 16 in contact with the protrusion 18*s* is compressed more strongly than the rest of the felt sheet. This allows the felt sheet 16 to present a higher sealing performance that prevents the lubricant from leaking outward from the inside to the outside in the radial direction than if there were no pressing portions.

The protrusion 18*s* is formed so that the axial distance between the output outer flange 18 and the cover inner flange 23 is reduced. The protrusion 18*s* is formed on the lower surface 18*a* of the output outer flange 18 facing the cover inner flange 23. The protrusion 18*s* projects from the output outer flange 18 toward the cover inner flange 23 in the direction that the axial distance between the output outer flange 18 and the cover inner flange 23 becomes smaller.

The protrusion 18*s* is formed continuously over the entire circumference of the output outer flange 18 in the radial direction. The protrusion 18*s* has substantially the same radial sectional shape over the entire circumference. The protrusion 18*s* has substantially the same convex shape in the axial direction over the entire circumference. The apex of the protrusion 18*s* is situated on the radially outer side of an inner circumferential edge 23*t* of the cover inner flange 23. The apex of the protrusion 18*s* is situated on the radially outer side of the outer circumferential surface 14*d* of the output block 14. The apex of the protrusion 18*s* is situated on the radially outer side of the inner circumferential edge 16*t* of the felt sheet 16. The apex of the protrusion 18*s* is situated on the radially inner side of the outer circumferential surface 18*r* of the output outer flange 18. In this manner, the protrusion 18*s* is formed facing the upper surface 23*a* of the cover inner flange 23.

The output outer flange 18 has an inclined surface 18*f* extends in the radial direction from the top of the protrusion toward the outside. The inclined surface 18*f* is continuous from the top of the protrusion 18*s* to the outer circumferential surface 18*r* of the output outer flange 18 and forms a substantially annular conical surface. The inclined surface 18*f* is not limited to the above configuration, provided that it is tapered. The inclined surface 18*f* may be continuous from the apex of the protrusion 18*s* to the outer circumferential surface 18*r* of the output outer flange 18, or it may be configured to be continuous from the apex of the protrusion 18*s* to the radially inner side of the outer circumferential surface 18*r*.

The protrusion 18*s* is formed such that it has a cylindrical surface that extends vertically in the axial direction from the apex to the radially inner side of the output outer flange 18. The protrusion 18*s* may have an inclined surface from the apex to the radially inner side similarly to the inclined surface 18*f*. The protrusion 18*s* is formed such that the apex of the protrusion 18*s* has an R surface. The R surface at the apex of the protrusion 18*s* is a curved surface having a radius of curvature in the radial section. The apex of the protrusion 18*s* is also formed to be smooth in the circumferential direction.

The axial distance between the apex of the protrusion 18*s* and the upper surface 23*a* of the cover inner flange 23 is smaller than the thickness of the felt sheet 16 measured in the unassembled state. At a position different from the protrusion 18*s* in the radial direction, the axial distance between the lower surface 18*a* of the output outer flange 18 and the upper surface 23*a* of the cover inner flange 23 may be smaller or slightly larger than the thickness of the felt sheet 16 measured in the unassembled state.

The felt sheet 16 is locally compressed in the axial direction by the protrusion 18*s*. Thus, the lubricant used for meshing of the small gear 27 with the annular gear 4 is inhibited from flowing along the outer surface 14*d* of the output block body 14 in the axial direction from the immediate vicinity (directly above) of the annular gear 4. In addition, the lubricant is inhibited from flowing radially outward along the lower surface 18*a* of the output outer flange 18. At the same time, the lubricant is inhibited from flowing along the outer surface 14*d* of the output block body 14 in the axial direction from the immediate vicinity (directly above) of the annular gear 4. The lubricant is inhibited from flowing radially outward along the upper surface 23*a* of the cover inner flange 23.

The protrusion 18*s* prevents the lubricant from soaking into the felt sheet 16 and leaking outward. In other words, the protrusion 18*s* stops the lubricant leaking toward the outside by compressing the felt sheet 16 more strongly and locally. Leakage of lubricant can be efficiently controlled in the immediate vicinity of the annular gear 4. Moreover, the size of the positioner 100 itself can also be reduced.

The output block body 14 is rotated relative to the cover body 31, which is fixed to the base 2 (bearing mounting portion 6). The felt sheet 16 is only held by the cover inner flange 23 and the output outer flange 18. Therefore, the cover inner flange 23 and the output outer flange 18 are slidable against the felt sheet 16.

Thus, the felt sheet 16 rotates relative to the output outer flange 18 at a smaller rotational speed than the output outer flange 18. The felt sheet 16 slidably rotates relative to the cover inner flange section 23, which is fixed to the base 2. The felt sheet 16 that is locally compressed by the protrusion 18*s* is more easily maintained in the held state by compression by the cover inner flange 23 and the output outer flange 18 than without the protrusion 18*s*. The gap between the cover 15 and the output block body 14 can be made smaller by providing the protrusion 18*s*. Therefore, the sealing member (felt sheet 16) can be made smaller and simpler. The size of the leakage control mechanism 301 can also be made smaller.

Moreover, the cover inner flange 23 and the output outer flange 18 with the protrusion 18*s* face each other in the axial direction. The felt sheet 16 is held between the cover inner flange 23 and the output outer flange 18 with the protrusion 18*s* in the axial direction (in the thickness direction of the annular gear 4 (outer ring 9)). With this configuration, the sealing property is enhanced, and the leakage control mechanism 301 can be made smaller in the radial direction than when the cover inner flange 23 and the output outer flange 18 face each other in the radial direction.

Since the apex of the protrusion 18*s* is rounded, it is possible to prevent the protrusion 18*s* from catching on the felt sheet 16 between the output outer flange 18 and the felt sheet 16, which slide circumferentially against each other. Therefore, the felt sheet 16 can be prevented from tearing.

The protrusion 18*s* can be formed at the same time as the outer circumferential surface 14*d* of the output block body 14 when manufacturing the output block body 14 and the output outer flange 18. In other words, if machining with a vertical lathe is performed to form the output outer flange 18 as a step of the output block body 14, the protrusion 18*s* can be machined simultaneously with the step as long as the protrusion 18*s* is continuous on the circumference. For this reason, it is preferable that the protrusion 18*s* extend continuously in the entire circumferential length.

In the third embodiment, the bearing 3 and annular gear 4 are attached to the base 2, and then the cover 15 is attached. The felt sheet 16, which has the annular plate shape, is placed on the cover inner flange 23. The output block body 14 is then attached to the annular gear 4 so that the outer circumferential surface 14*d* is fitted onto the inner circumferential edge 16*t* of the annular felt sheet 16.

Alternatively, the bearing 3, annular gear 4, and cover 15 are attached to the base 2. Then, the felt sheet 16 is assembled with the output block body 14 by assembling the annular felt sheet 16 so that the inner circumferential edge 16*t* contacts the outer circumferential surface 14*d* of the output block body 14. The output block body 14 and felt sheet 16 assembled together is attached to the annular gear 4.

The axial distance between the output outer flange 18 and the cover inner flange 23 is substantially the same as the thickness of the felt sheet 16. The felt sheet 16, the porous material that can be compressed and deformed, is held between the output outer flange 18 and the cover inner flange 23. The felt sheet 16 extends along the upper surface 23*a* of the cover inner flange 23 over its entire circumference in the radial direction.

This allows easy assembly without worrying about dimensional tolerances, even after the protrusion 18*s* has been formed. Thus, it possible to improve the efficiency of assembly work and shorten the work time, as well as improve the sealing performance. During the assembly, no careful adjustment relating to the seal is required, and sufficient sealing performance of the leakage control mechanism 301 can be achieved simply by inserting the felt sheet 16. The protrusion 18*s* is formed integrally with the output outer flange 18, which improves the sealing performance while reducing the number of parts.

The third embodiment produces the same advantageous effects as the first embodiment described above. The sealing performance of the felt sheet 16 can be improved. Since the felt sheet 16 can be pressed down by the protrusion 18*s* ahead (downstream) of the leakage flow rather than the outer surface 14*d*, which serves as a circuitous route for the lubricant, the leakage of the lubricant can be efficiently controlled.

In the third embodiment, the protrusion 18*s* was formed continuously over the entire circumference of the output outer flange 18 in the radial direction. Alternatively, it can also be formed intermittently in the circumferential direction. Alternatively, the sectional shape of the protrusion 18*s* in the radial direction may vary in the circumferential direction. In other words, the axial dimension of the convex shape of the protrusion 18*s* may vary in the circumferential direction. In this case, the apex of the protrusion 18*s* is preferably formed in a rounded or smoothed shape even in the circumferential direction so that it does not catch the felt sheet 16 and tear the felt sheet 16.

Fourth Embodiment

Figure 6:
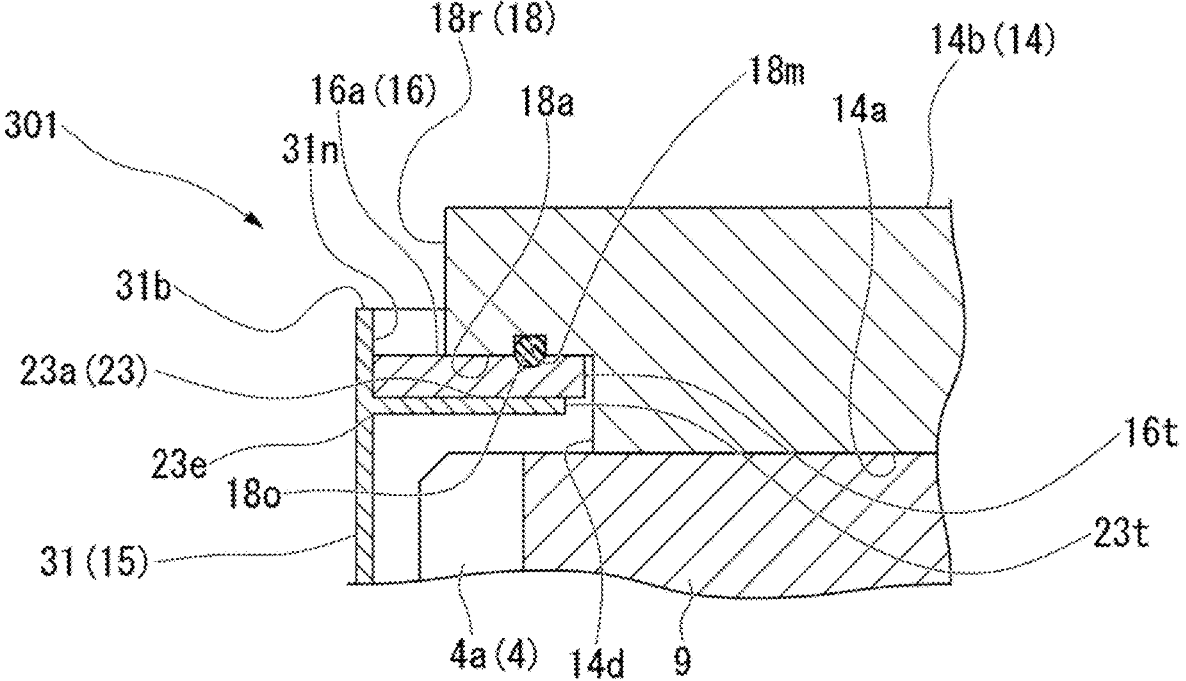
FIG. 6 is an enlarged sectional perspective view of a lubricant leakage control mechanism in a fourth embodiment of the invention.

The fourth embodiment of the lubricant leakage control mechanism and gear mechanism will now be described with reference to FIG. 6. FIG. 6 is an enlarged sectional view of a positioner, which is the gear mechanism equipped with the lubricant leakage control mechanism 301 relating to the fourth embodiment.

<Leakage Control Mechanism>

As shown in FIG. 6, the leakage control mechanism 301 is equipped with a ring groove 18*m* and an O-ring 18*o* as a convex shape that serves as the pressing portion. The O-ring 18*o* as the pressing portion presses the felt sheet 16 so that the felt sheet is compressed locally more strongly than the other portions of the felt sheet. The O-ring 18*o* compresses the felt sheet 16 more strongly by locally applying a compression force Pq1 in the axial thickness direction, which will be described with reference to FIG. 13. The ring groove 18*m* is formed in the lower surface 18*a* of the output outer flange 18. The ring groove 18*m* is formed over the entire circumference of the lower surface 18*a* of the output outer flange 18. The ring groove 18*m* is situated on the radially outer side of the outer surface 14*d*. The ring groove 18*m* is formed such that it extends at equidistant from the outer circumferential surface 14*d* in the radial direction.

The O-ring 18*o* is fitted in the ring groove 18*m*. The O-ring 18*o* protrudes from the ring groove 18*m* toward the upper surface 23*a* of the cover inner flange 23. Thus, the O-ring 18*o* presses and compresses the felt sheet 16 against the upper surface 23*a* of the cover inner flange 23 in the same manner as the protrusion 18*s* shown in FIG. 5 as the third embodiment. The radial dimension of the O-ring 18*o* is the same as the radial dimension of the apex of the protrusion 18*s* of the third embodiment shown in FIG. 5. The ring groove 18*m* is not limited to any particular shape as long as the O-ring 18*o* can exhibit the sealing properties as the pressing portion.

The ring groove 18*m* and O-ring 18*o* are formed continuously over the entire circumference of the output outer flange 18 in the radial direction. The ring groove 18*m* and O-ring 18*o* have substantially the same radial sectional shape in the radial direction. The ring groove 18*m* has substantially the same concave shape in the axial direction over the entire circumference. The O-ring 18*o* has substantially the same convex shape in the axial direction over the entire circumference.

The ring groove 18*m* and O-ring 18*o* are arranged such that the top of the O-ring 18*o* is situated on the radially outer side of the inner circumferential edge 23*t* of the cover inner flange 23. The ring groove 18*m* and O-ring 18*o* are arranged such that the top of the O-ring 18*o* is situated on the radially outer side of the outer circumferential surface 14*d* of the output block 14. The ring groove 18*m* and O-ring 18*o* are arranged such that the top of the O-ring 18*o* is situated on the radially outer side of the inner circumferential edge 16*t* of the felt sheet 16.

The ring groove 18*m* and O-ring 18*o* are arranged such that the top of the O-ring 18*o* is situated on the radially inner side of the outer circumferential surface 18*r* of the output outer flange 18. In this manner, the ring groove 18*m* and O-ring 18*o* are formed to oppose the upper surface 23*a* of the cover inner flange 23.

The length the part of the O-ring 18*o* protruding from the ring groove 18*m* toward the upper surface 23*a* of the cover inner flange 23 can be set similar to the length of the part of the apex of the protrusion 18*s* protruding axially from the lower surface 18*a* shown in FIG. 5 of the third embodiment. The O-ring 18*o* needs to have a hardness that enables it to press and compress the felt sheet 16. Depending on the hardness of the O-ring 18*o*, i.e., the degree of compression of the pressed felt sheet 16, the degree in which the O-ring 18*o* protrudes from the ring groove 18*m* toward the upper surface 23*a* of the cover inner flange 23 can be increased or decreased.

As described above, in the fourth embodiment, the ring groove 18*m* and O-ring 18*o* function in the same way as the protrusion 18*s* of the third embodiment shown in FIG. 5, where the protrusion 18*s* has the curved inclined surface 18*f* and the curved inner surface in the radial direction. In the fourth embodiment, the O-ring 18*o* also functions as the sealing member.

In the fourth embodiment, the bearing 4 and annular gear 4 are attached to the base 2, and then the cover 15 is attached. The felt sheet 16, which has the annular plate shape, is placed on the cover inner flange 23. The O-ring 18*o* is fitted in the ring groove 18*m* of the output block body 14. The output block body 14 is then attached to the annular gear 4 so that the outer circumferential surface 14*d* is fitted onto the inner circumferential edge 16*t* of the annular felt sheet 16.

Alternatively, the bearing 3, annular gear 4, and cover 15 are attached to the base 2. The O-ring 18*o* is then fitted in the ring groove 18*m* of the output block body 14. The felt sheet 16 is assembled with the output block body 14 by assembling the annular felt sheet 16 so that the inner circumferential edge 16*t* contacts the outer circumferential surface 14*d* of the output block body 14. The output block body 14, O-ring 18*o*, and felt sheet 16 assembled together is attached to the annular gear 4.

The fourth embodiment produces the same advantageous effects as the first embodiment described above. In addition to the felt sheet 16, the O-ring 18*o* can enhance the sealing performance.

Fifth Embodiment

Figure 7:
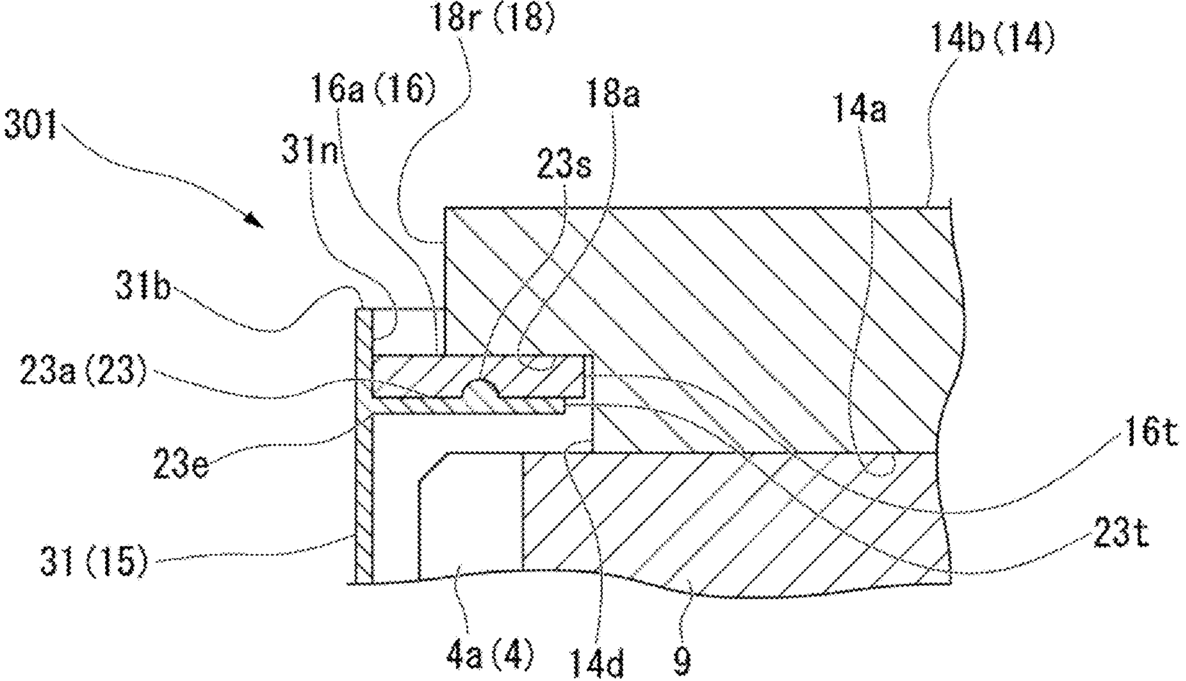
FIG. 7 is an enlarged sectional perspective view of a lubricant leakage control mechanism in a fifth embodiment of the invention.

The fifth embodiment of the lubricant leakage control mechanism and gear mechanism will now be described with reference to FIG. 7. FIG. 7 is an enlarged sectional view of a positioner, which is a gear mechanism equipped with the lubricant leakage control mechanism 301 of the fifth embodiment.

<Leakage Control Mechanism>

As shown in FIG. 7, the leakage control mechanism 301 is equipped with ball projection portions 23*s* (pressing portions) as a convex shape that serves as the pressing portion. The ball projection portions 23*s* as the pressing portion press the felt sheet 16 so that the felt sheet is compressed locally more strongly than the other portions of the felt sheet. The ball projection portions 23*s* compress the felt sheet 16 more strongly by locally applying a compression force Pq1 in the axial thickness direction, which will be described with reference to FIG. 13. The ball projection portions 23*s* are each formed to project axially from the upper surface 23*a* of the cover inner flange 23 toward the lower surface 18*a* of the output outer flange 18. The ball projection portions 23*s* are arranged at intervals in the circumferential direction on the cover inner flange 23 over the entire circumference of the flange 23 in the radial direction.

One ball projection portion 23*s* is formed in a hemispherical shape that projects axially from the upper surface 23*a* of the cover inner flange 23 toward the lower surface 18*a* of the output outer flange 18. In other words, the ball projection portions 23*s* as the pressing portion are each formed to have the top with a curved surface. The curved surface here is smooth in both the circumferential and radial directions. The plurality of the ball projection portions 23*s* may all be formed so that they have the same axial height protruding from the upper surface 23*a* of the cover inner flange 23. The plurality of ball projection portions 23*s* are all formed to have substantially the same outer profile on the upper surface 23*a* of the cover inner flange 23. Specifically, they can be formed in the same shape like a welding ball on the upper surface 23*a* of the cover inner flange 23.

The plurality of ball projection portions 23*s* are arranged such that the radial position of the apex of each projection portion is same as or slightly outward from the radial position of the apex of the protrusion 18*s* of the third embodiment shown in FIG. 5. The apexes of the ball projection portions 23*s* are situated radially outer side of the inner circumferential edge 23*t* of the cover inner flange 23. The tops of the ball projection portions 23*s* are situated on the radially outside of the outer circumferential surface 14*d* of the output block 14. The tops of the ball projection portions 23*s* are situated on the radially outside of the inner circumferential edge 16*t* of the felt sheet 16. The tops of the ball projection portions 23*s* are situated radially inner side of the outer circumferential surface 18*r* of the output outer flange 18. In this manner, the ball projection portions 23*s* are formed facing the lower surface 18*a* of the cover inner flange 18.

The plurality of ball projection portions 23*s* all compress the felt sheet 16 more strongly and locally. This stops the lubricant leaking toward the outside. Leakage of lubricant can be efficiently controlled in the immediate vicinity of the annular gear 4. The ball projection portions 23*s* are formed at intervals in the circumferential direction. Thus, the ball projection portions can prevent the felt sheet 16 that is slid by the output outer flange 18 from turning. Specifically, the cover inner flange 23 and the felt sheet 16 do not slide, but the output outer flange 18 and the felt sheet 16 slide. This can efficiently prevent the leakage of the lubricant flowing radially outward along the upper surface 23*a* of the cover inner flange 23. The ball projection portions 23*s* are formed integrally with the cover inner flange 23 so that it is possible to improve the sealing performance while reducing the number of parts. The ball projection portions 23*s* can be formed more easily than the protrusion 18*s* of the third embodiment shown in FIG. 5. Therefore, the manufacturing process can be facilitated, and the manufacturing cost can be reduced.

In the fifth embodiment, the ball projection portions 23*s* are arranged at intervals in the circumferential direction. Alternatively, the ball projection portions 23*s* can also be formed on the upper surface 23*a* of the cover inner flange 23 as a continuous circumferential protrusion. In this case, the protrusion compresses the felt sheet 16 as the pressing portion to inhibit the lubricant from flowing axially along the outer circumferential surface 14*d* of the output block body 14 from the immediate vicinity (directly above) of the annular gear 4. The felt sheet 16 inhibits the lubricant from flowing radially outward along the upper surface 23*a* of the cover inner flange 23.

At the same time, the lubricant is inhibited from flowing along the outer surface 14*d* of the output block body 14 in the axial direction from the immediate vicinity (directly above) of the annular gear 4. In addition, the lubricant is inhibited from flowing radially outward along the lower surface 18*a* of the output outer flange 18. In this case, the tops of the projection portions are each preferably formed in a rounded or smoothed shape even in the circumferential direction so that they do not catch the felt sheet 16 and tear the felt sheet 16.

The fifth embodiment produces the same advantageous effects as the first embodiment described above.

Sixth Embodiment

Figure 8:
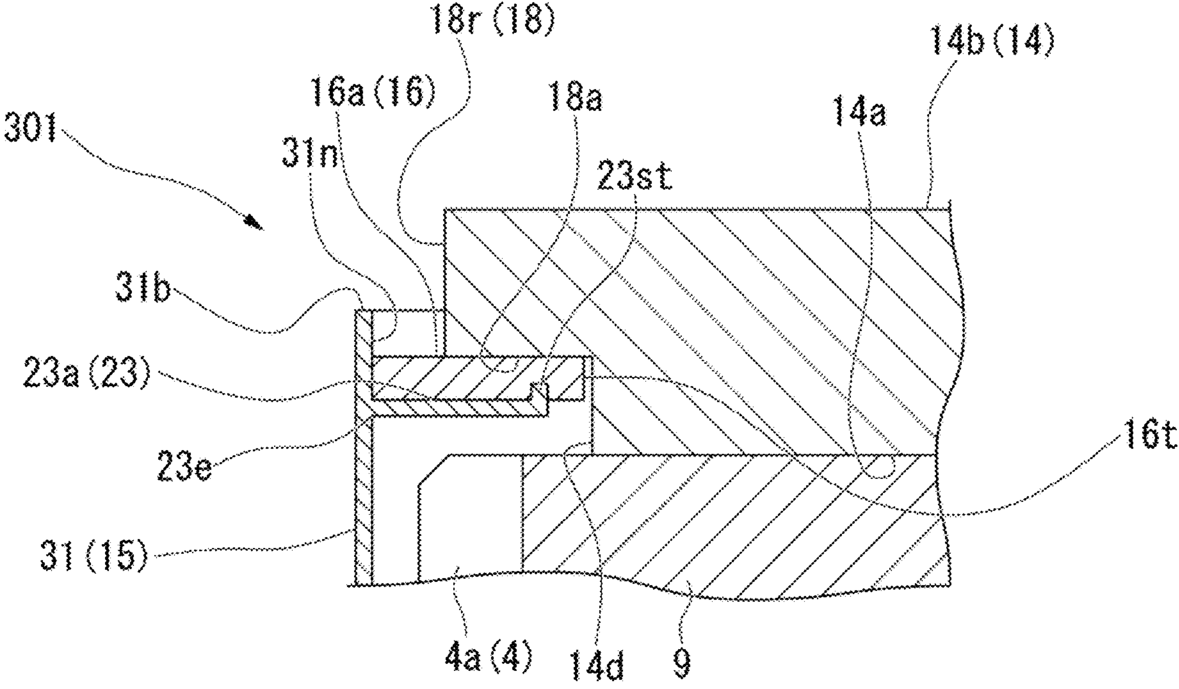
FIG. 8 is an enlarged sectional perspective view of a lubricant leakage control mechanism in a sixth embodiment of the invention.

The sixth embodiment of the lubricant leakage control mechanism and gear mechanism is described below with reference to FIG. 8. FIG. 8 is an enlarged sectional view of a positioner, which is a gear mechanism equipped with the lubricant leakage control mechanism 301 relating to the sixth embodiment.

<Leakage Control Mechanism>

As shown in FIG. 8, the leakage control mechanism 301 is equipped with a folded end 23*st* (pressing portion) as a convex shape that serves as the pressing portion. The folded end 23*st* as the pressing portion presses the felt sheet 16 so that the felt sheet is compressed locally more strongly than the other portions of the felt sheet. The folded end 23*st* compresses the felt sheet 16 more strongly by locally applying a compression force Pq1, which will be described with reference to FIG. 13, in the axial thickness direction.

The folded end 23*st* is formed by folding the inner circumferential edge 23*t* of the cover inner flange 23 so that it projects axially from the upper surface 23*a* toward the lower surface 18*a* of the output outer flange 18. The folded end 23*st* is formed continuously over the entire circumference of the cover inner flange 23 in the radial direction.

The folded end 23*st* is formed so that the axial height of the part of the folded end 23*st* that projects axially from the upper surface 23*a* of the cover inner flange 23 is approximately the same as the axial height of the part of the protrusion 18*s* that projects axially from the lower surface 18*a* as shown in FIG. 5 of the third embodiment. In other words, the folded end 23*st* as the pressing portion is formed to have the top with a curved surface. The curved surface here is smooth also in the radial direction.

The folded end 23*st* is formed continuously over the entire circumference of the cover inner flange 23 in the radial direction. The folded end 23*st* has substantially the same radial sectional shape over the entire circumference. The folded end 23*st* has substantially the same convex shape in the axial direction over the entire circumference. The top of the folded end 23*st* substantially aligns in the radial direction with the inner circumferential edge 23*t* of the cover inner flange 23. The top of the folded end 23*st* is situated on the radially outer side of the outer circumferential surface 14*d* of the output block 14.

The top of the folded end 23*st* is situated on the radially outer side of an inner circumferential edge 16*t* of the felt sheet 16. The top of the folded end 23*st* is situated radially inner side of the outer circumferential surface 18*r* of the output outer flange 18. The top of the folded end 23*st* is situated radially on the inner side of the apex of the protrusion 18*s* of the third embodiment shown in FIG. 5. In this manner, the folded end 23*st* is formed facing the lower surface 18*a* of the cover inner flange 18.

The folded end 23*st* compresses the felt sheet 16 as the pressing portion to inhibit the lubricant from flowing axially along the outer surface 14*d* of the output block body 14 from the immediate vicinity (directly above) of the annular gear 4. The folded end 23*st* inhibits the lubricant from flowing radially outward along the upper surface 23*a* of the cover inner flange 23. In particular, leakage of the lubricant can be controlled (upstream) before it reaches the upper surface 23*a* of the cover inner flange 23.

The sixth embodiment produces the same advantageous effects as the first embodiment described above.

The folded end 23*st* is formed continuously in the circumferential direction. Alternatively it can be formed intermittently in the circumferential direction, similar to the ball projection portions 23*s*. In this case, the folded end 23*st* functions as a stopper that prevents turning of the felt sheet 16. In this case, the tops of the projection portions are each preferably formed in a rounded or smoothed shape even in the circumferential direction so that they do not catch the felt sheet 16 and tear the felt sheet 16.

Seventh Embodiment

Figure 9:
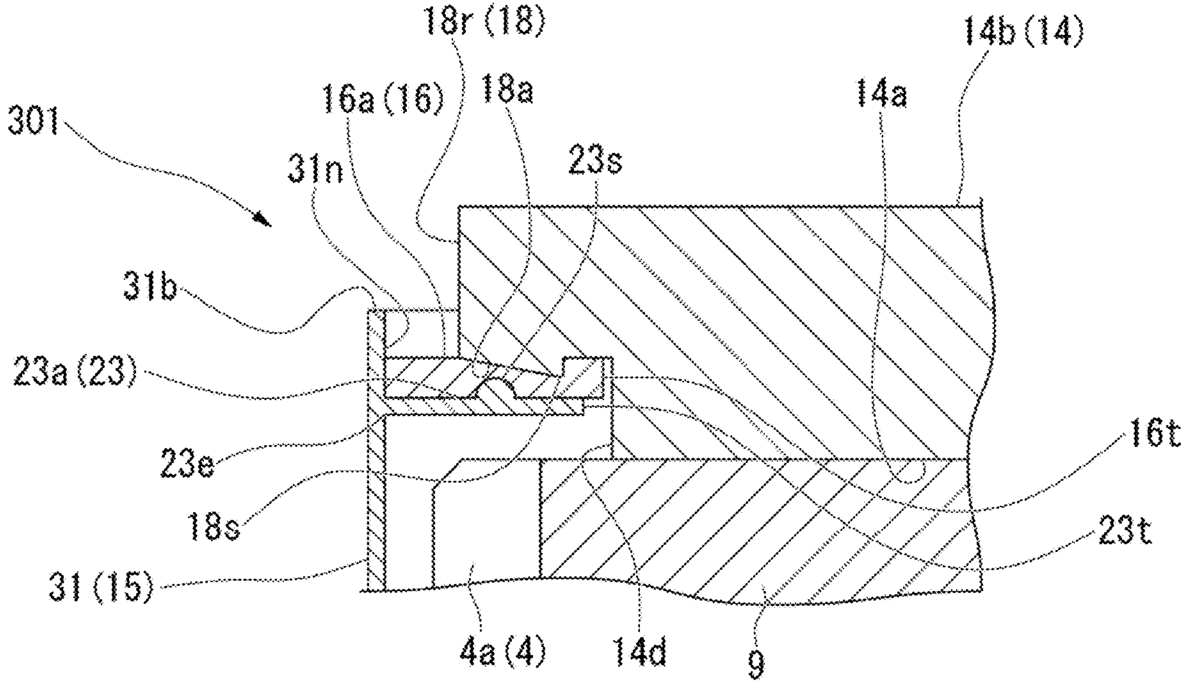
FIG. 9 is an enlarged sectional perspective view of a lubricant leakage control mechanism in a seventh embodiment of the invention.

The seventh embodiment of the lubricant leakage control mechanism and gear mechanism will now be described with reference to FIG. 9. FIG. 9 is an enlarged sectional view of a positioner, which is a gear mechanism equipped with the lubricant leakage control mechanism 301 relating to the seventh embodiment.

<Leakage Control Mechanism>

As shown in FIG. 9, the leakage control mechanism 301 has, as the convex shapes serving as the pressing portions, configuration similar to the protrusion 18*s* (pressing portion) of the third embodiment shown in FIG. 5 and the ball projection portions 23*s* (pressing portions) of the fifth embodiment shown in FIG. 7. The protrusion 18*s* and ball projection portions 23*s* as the pressing portions press the felt sheet 16 so that the felt sheet is compressed locally more strongly than the other portions of the felt sheet. The protrusion 18*s* (pressing portion) and ball projection portions 23*s* (pressing portions) compress the felt sheet 16 more strongly by locally applying a compression force Pq1, which will be described with reference to FIG. 13, in the axial thickness direction.

The ball projection portions 23*s*, which are the pressing portions, project axially from the upper surface 23*a* at the inner circumferential edge 23*t* of the cover inner flange 23. The projection 18*s*, which is the pressing portion, projects axially from the lower surface 18*a* of the output outer flange 18. In other words, the projection 18*s* and the ball projection portions 23*s* project toward the felt sheet 16 in their opposing direction and compress the felt sheet 16.

Further, the apex of the protrusion 18*s* is situated on the radially outer side of the outer circumferential surface 14*d* of the output block 14. The apex of the protrusion 18*s* is situated on the outer side of an inner circumferential edge 16*t* of the felt sheet 16. The apex of the protrusion 18*s* is situated on the radially outer side of an inner circumferential edge 23*t* of the cover inner flange 23. The tops of the ball projection portions 23*s* are situated on the radially outside of the apex of the protrusion 18*s*. The tops of the ball projection portions 23*s* are situated radially inner side of the outer circumferential surface 18*r* of the output outer flange 18.

In this manner, the protrusion 18*s* is formed facing the upper surface 23*a* of the cover inner flange 23. The ball projection portions 23*s* are formed such that they face the lower surface 18*a* of the cover inner flange 18. Moreover, the protrusion 18*s* and the ball projection portions 23*s* are located at different positions in the radial direction from each other. Thus, the felt sheet 16 is pressed and compressed in opposite directions at these two locations in the radial direction. Therefore, it is possible to inhibit the lubricant from flowing radially outward at the two locations in the radial direction. In addition, the tops of the ball projection portions 23*s* can serve as the stopper that prevents the felt sheet 16 from turning since the tops are situated on the outside of the inner circumferential edge 16*t* of the felt sheet 16.

The seventh embodiment produces the same advantageous effects as the first embodiment described above. The protrusion 18*s* can press the felt sheet 16 and inhibit leakage of the lubricant along the lower surface 18*a*. The ball projection portions 23*s* can press the felt sheet 16 to efficiently prevent leakage of the lubricant along the upper surface 23*a*. At the same time, the ball projection portions 23*s* can serve as the stopper that prevents the felt sheet 16 from turning. Therefore, the leakage of the lubricant along the upper surface 23*a* can be controlled even more efficiently. Consequently, the sealing performance of the felt sheet 16 can be improved.

Eighth Embodiment

Figure 10:
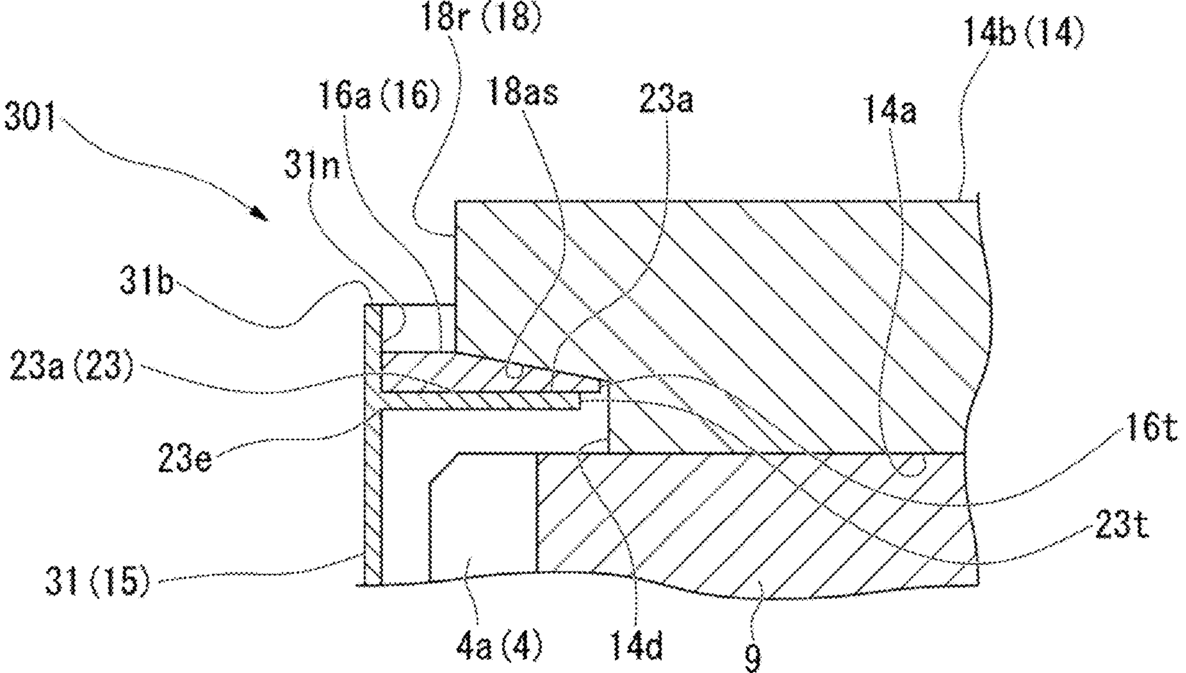
FIG. 10 is an enlarged sectional perspective view of a lubricant leakage control mechanism in an eighth embodiment of the invention.

The eighth embodiment of the lubricant leakage control mechanism and gear mechanism will now be described with reference to FIG. 10. FIG. 10 is an enlarged sectional view of a positioner, which is a gear mechanism equipped with the lubricant leakage control mechanism 301 relating to the eighth embodiment.

<Leakage Control Mechanism>

As shown in FIG. 10, the leakage control mechanism 301 has an inclined surface 18*as* (pressing portion), which is the tapered lower surface 18*a* of the output outer flange 18 rather than a locally convex portion as the pressing portion. The inclined surface 18*as* the pressing portion presses and compress the felt sheet 16 locally and strongly at the portion closer to the outer circumferential surface 14*d* of the output block body 14 rather than at the portion closer to the outer circumferential surface 18*r* of the output outer flange 18. The inclined surface 18*as* the pressing portion compresses the felt sheet 16 more strongly by locally applying the compression force Pq1 in the axial thickness direction, which will be later described with reference to FIG. 13, at the portion closer to the outer circumferential surface 14*d* of the output block body 14 rather than at the portion closer to the outer circumferential surface 18*r* of the output outer flange 18.

The inclined surface 18*as* inclines in the radial direction from the outer circumferential surface 14*d* of the output block body 14 to the outer circumferential surface 18*r* of the output outer flange 18. The inclined surface 18*as* inclines from the outside to the inside in the radial direction so that the axial distance between the lower surface 18*a* of the output outer flange 18 and the upper surface 23*a* of the cover inner flange 23 decreases. In other words, the force of the inclined surface 18*as* pressing to compress the felt sheet 16 gradually increases from the outer circumferential surface 18*r* to the inner circumferential edge 23*t*, from outside to inside in the radial direction. The force of the inclined surface 18*as* pressing to compress the felt sheet 16 in the axial direction is strongest at the position of the inner circumferential edge 23*t* of the cover inner flange 23.

The axial distance between the bottom surface 18*a* of the output outer flange 18 and the upper surface 23*a* of the cover inner flange 23 is defined by the inclination of the inclined surface 18*as*. However, at the inner circumferential edge 23*t* of the cover inner flange 23, which is the innermost position, the axial distance is preferably about the same or smaller than the axial distance between the apex of the protrusion 18*s* and the upper surface 23*a* of the third embodiment shown in FIG. 5. Compared to the protrusion 18*s* of the third embodiment shown in FIG. 5, the inclined surface 18*as* having a simple tapered shape is easier to manufacture and be processed as an integral part of the output block body 14.

The eighth embodiment produces the same advantageous effects as the first embodiment described above. The inclined surface 18*as* is configured to incline in the radial direction from the outer circumferential surface 14*d* of the output block body 14 to the outer circumferential surface 18*r* of the output outer flange 18. Alternatively, the inclined surface 18*as* may be configured to incline from a position that is on the radially outer side of the outer circumferential surface 14*d* toward the outer circumferential surface 18*r*. Alternatively, the inclined surface 18*as* may be configured to slope toward the outer circumferential surface 14*d* from a position that is on the radially inner side of the outer circumferential surface 18*r*.

Ninth Embodiment

Figure 11:
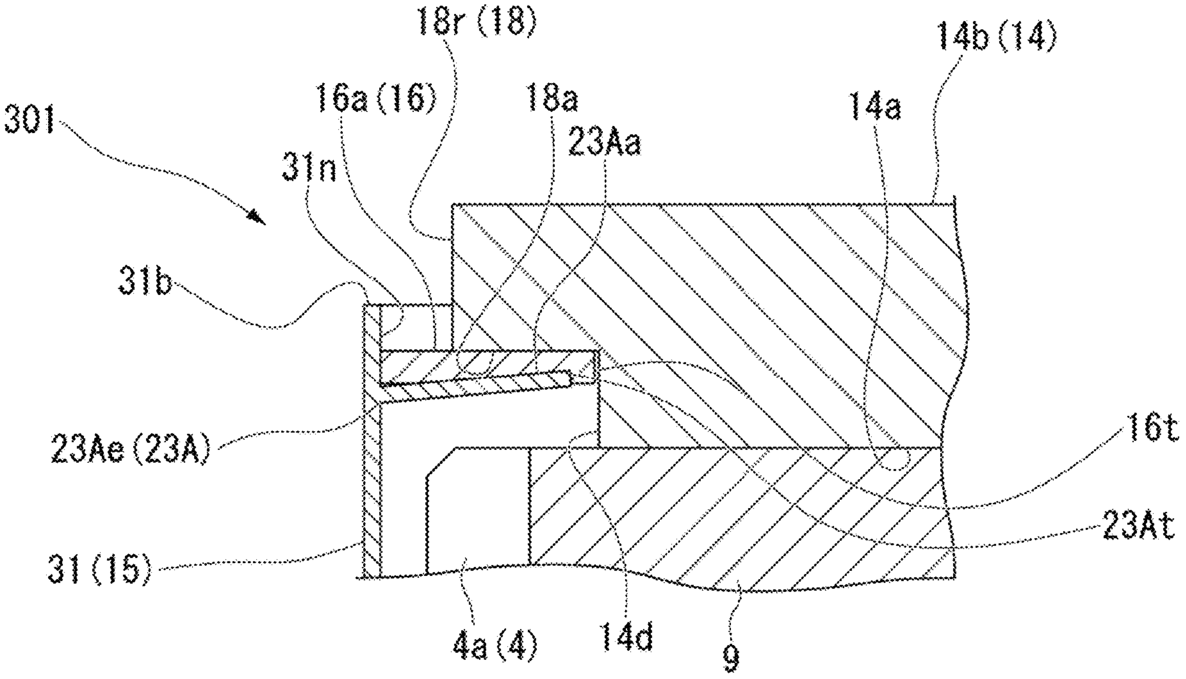
FIG. 11 is an enlarged sectional perspective view of a lubricant leakage control mechanism in a ninth embodiment of the invention.

The ninth embodiment of the lubricant leakage control mechanism and gear mechanism will now be described with reference to FIG. 11. FIG. 11 is an enlarged sectional view of a positioner, which is a gear mechanism equipped with the lubricant leakage control mechanism 301 relating to the ninth embodiment.

<Leakage Control Mechanism>

The leakage control mechanism 301 has a cover inner inclined flange 23A (pressing portion) inclined in the radial direction as the pressing portion, as shown in FIG. 11. The cover inner inclined flange 23A (cover inner flange) is inclined so that the radially inner side thereof is situated closer to the lower surface 18A of the output outer flange 18 in the axial direction than the radially outer side thereof. The cover inner inclined flange 23A is inclined so that a radially inner edge 23At is situated closer to the lower surface 18*a* of the output outer flange 18 in the axial direction than a radially outer edge 23Ae that is connected to an inner circumferential surface 31*n* of the cylindrical cover body 31.

In other words, the cover inner inclined flange 23A is inclined so that the axial distance between the inner circumferential edge 23At and the lower surface 18*a* of the output outer flange 18 is smaller than the axial distance between the upper surface 23Aa and the outer surface 18*r* of the output outer flange 18. Thus, the upper surface 23Aa of the cover inner inclined flange 23A forms a tapered surface. In the cover inner inclined flange 23A, the apex, which is the boundary between the upper surface 23Aa and the inner circumferential edge 23At, has a curved surface.

In the ninth embodiment, the upper surface 23Aa of the cover inner inclined flange 23A functions in the same way as the inclined surface 18*as* which is the pressing portion shown in FIG. 10 as the eighth embodiment. A portion of the cover inner inclined flange 23Aa where is adjacent to the outer surface 14*d* of the output block body 14 presses and compresses the felt sheet 16 locally and most strongly. In other words, the pressing force by the upper surface 23Aa that compresses the felt sheet 16 between the upper surface 23Aa and the lower surface 18*a* increases toward the inner radial direction with reference to the pressing force around the outer circumferential surface 18*r*. The pressing force by the upper surface 23Aa that compresses the felt sheet 16 between the upper surface 23Aa and the lower surface 18*a* increases to be strongest at the inner circumferential edge 23At. As a result of the inclination of the upper surface 23Aa, the portion of the cover inner inclined flange 23A that is close to the outer circumferential surface 14*d* of the output block body 14 locally applies the compression force Pq1 in the axial thickness direction, which will be later described with reference to FIG. 13. Thus, the cover inner inclined flange 23A strongly compresses the felt sheet 16.

The cover inner inclined flange 23A is inclined corresponding to the inclination of the upper surface 23Aa and fixed to the inner circumferential surface 31*n* of the cylindrical cover body 31 along the axial direction. The cover inner inclined flange 23A has a constant thickness in the radial direction, that is, its axial dimension is constant from the outer circumferential edge 23Ae to the inner circumferential edge 23At. The thickness of the cover inner inclined flange 23A may vary in the radial direction from the outer circumferential edge 23Ae to the inner circumferential edge 23At.

The upper surface 23Aa of the cover inner inclined flange 23A is inclined to form a tapered surface as shown in FIG. 11. In other words, the upper surface 23Aa is inclined when the felt sheet 16 and output block body 14 are assembled.

Thus, the upper surface 23Aa of the cover inner inclined flange 23A needs to be inclined to provide the tapered surface with the felt sheet 16 and output block body 14 assembled thereon. In this case, the upper surface 23Aa of the cover inner inclined flange 23A can form the tapered surface inclined at an inclination angle same as the inclination angle shown in FIG. 11, when the felt sheet 16 and output block body 14 are not assembled.

Alternatively, the upper surface 23Aa of the cover inner inclined flange 23A may form a tapered surface inclined at a greater angle of inclination than that shown in FIG. 11 when the felt sheet 16 and output block body 14 are not assembled. In this case, the felt sheet 16 and output block body 14 are assembled. In this way, it is possible to change the inclination angle at which the cover inner inclined flange 23A is connected to the cover body 31.

In this case, the cover inner inclined flange 23A is elastically deformed against the cover body 31 to be curved from the outer circumferential edge 23Ae. This increases the pressing force to compress the felt sheet 16 most at the position near the inner circumferential edge 23At. The elastic deformation of the cover inner inclined flange 23A against the cover body 31 increases the compression force to the felt sheet 16. In this way, the cover inner inclined flange 23A efficiently presses and compresses the felt sheet 16 as if it were an elastic member such as a spring.

Alternatively, the cover inner inclined flange 23A is not inclined at the outer circumferential edge 23Ae where it is connected to the inner circumferential surface 31N of the cover body 31, but it may be axially curved inwardly in the radial direction. In this case, the cover body 31 may be configured such that the upper surface 23Aa has a concave shape. In this case, the pressing force to compress the felt sheet 16 near the inner circumferential edge 23At can be increased compared to the configuration without the elastic deformation.

Thus, the ninth embodiment can control the leakage of the lubricant along the upper surface 23*a* even more efficiently. Consequently, the sealing performance of the felt sheet 16 can be improved.

Tenth Embodiment

Figure 12:
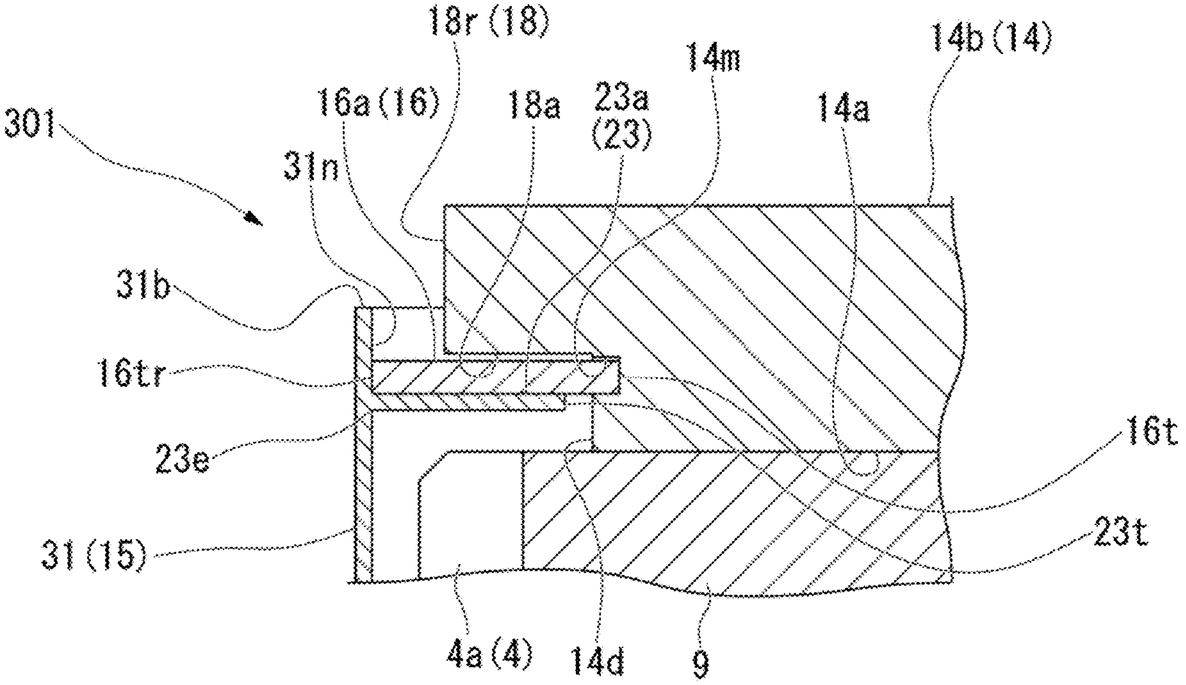
FIG. 12 is an enlarged sectional perspective view of a lubricant leakage control mechanism in a tenth embodiment of the invention.

The tenth embodiment of the lubricant leakage control mechanism and gear mechanism will now be described with reference to FIG. 12. FIG. 12 is an enlarged sectional view of a positioner, which is a gear mechanism equipped with the lubricant leakage control mechanism 301 of the tenth embodiment.

<Leakage Control Mechanism>

As shown in FIG. 12, the leakage control mechanism 301 is not configured to locally compress the felt sheet 16 in the axial direction using the pressing portion. The leakage control mechanism 301 compresses the felt sheet 16 in the radial direction along the lower surface 18*a* of the output outer flange 18. In other words, the leakage control mechanism 301 does not have a convex or tapered surface shape that locally compresses the felt sheet 16 as the pressing portion, as shown in FIG. 12. The leakage control mechanism 301 has an outer circumferential groove 14*m* (pressing portion), which is a concave shape that compresses the felt sheet 16 in the radial direction.

The outer circumferential groove 14*m* serving as the pressing portion is formed in the outer circumferential surface 14*d* of the output block body 14. The outer circumferential groove 14*m* is formed in the outer circumferential surface 14*d* in the axial direction in proximity to the lower surface 18*a*. The outer circumferential groove 14*m* is formed continuously over the entire circumference of the outer circumferential surface 14*d*. The outer circumferential groove 14*m* has a substantially identical radial section over the entire circumference of the outer circumferential surface 14*d*.

The radial depth of the outer circumferential groove 14*m* is set as follows. The outer circumferential groove 14*m* is formed such that the sum of the distance from the outer circumferential surface 14*d* of the output block body 14 to the outer circumferential edge 23*e* connected to the inner circumferential surface 31*n* of the cover body 31 and the radial depth of the outer circumferential groove 14*m* is smaller than the radial dimension of the felt sheet 16 when not assembled. The radial dimension of the felt sheet 16 is the length from the inner circumferential edge 16*t* to an outer circumferential edge 16*tr*.

Specifically, these components are formed such that the sum of the radial dimension of the cover inner flange 23, the radial distance between the inner circumferential edge 23*t* and the outer circumferential surface 14*d*, and the radial depth of the outer circumferential groove 14*m* are smaller than the radial dimension of the felt sheet 16 in the unassembled state. In other words, the cover and the groove are formed so that the sum of the radial distance from the inner surface 31*n* of the cover body 31 to the outer circumferential surface 14*d* of the output block body 14 and the radial depth of the outer circumferential groove 14*m* is smaller than the radial dimension of the felt sheet 16 in the unassembled state.

The outer circumferential groove 14*m* has an axial opening width larger than the thickness of the felt sheet 16 in the unassembled state. The axial opening width of the outer circumferential groove 14*m* is enough to allow the outer circumferential edge 16*t* of the felt sheet 16 to be inserted therein in the unassembled state. The axial opening width of the outer circumferential groove 14*m* can be any size as long as the felt sheet 16 is maintained as it seats along the upper surface 23*a*.

Figure 13:
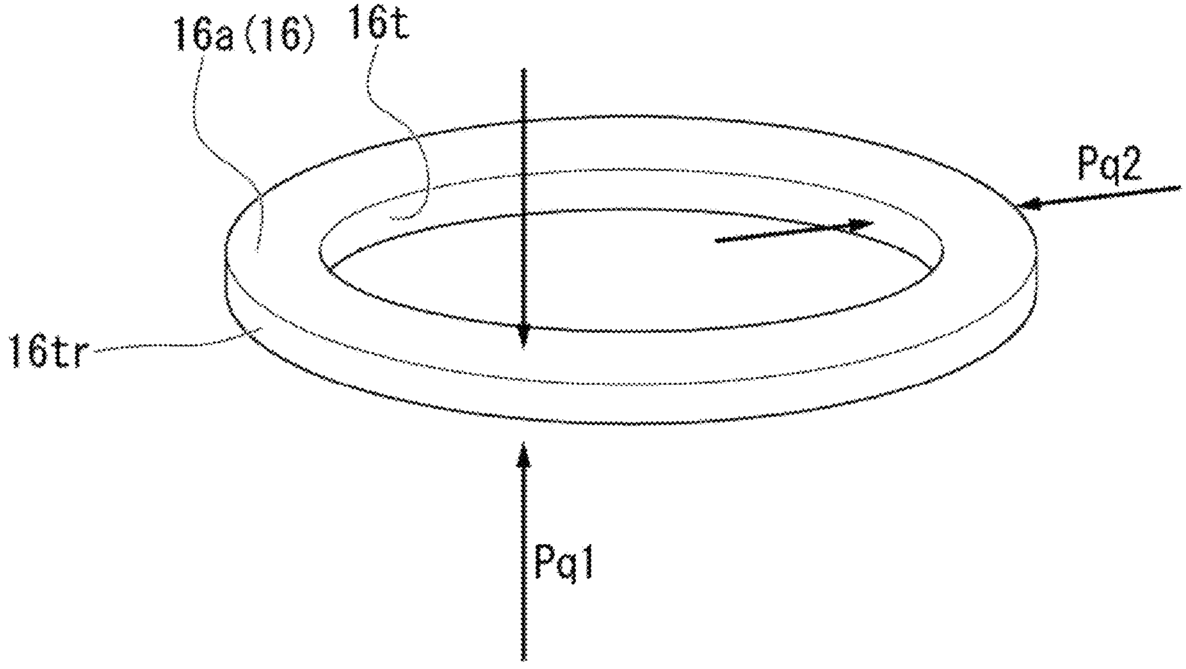
FIG. 13 is a perspective view illustrating a compression direction of a seal member in the lubricant leakage control mechanism in the embodiments of the present invention.

FIG. 13 is a perspective view illustrating the compression force acting on the felt sheet 16. As shown in FIG. 13, the inner circumferential edge 16*t* of the felt sheet 16 is accommodated in the outer circumferential groove 14*m*. The inner circumferential edge 16*t* of the felt sheet 16 is in contact with the outer circumferential groove 14*m*. The outer circumferential edge 16*tr* of the felt sheet 16 is in contact with the inner circumferential surface 31*n* of the cover body 31 at a position near above the upper surface 23*a*. The felt sheet 16 extends radially along the upper surface 23*a*. The felt sheet 16 is held between the inner circumferential surface 31*n* and the radial surface of the outer circumferential groove 14*m*.

The felt sheet 16 in the unassembled state is formed as an annular plate having a substantially uniform thickness. The distance from the inner circumferential surface 31*n* of the cover body 31 to the radial surface of the outer circumferential groove 14*m* is smaller than the radial width of the felt sheet 16, that is, the width from the inner circumferential edge 16*t* to the outer circumferential edge 16*tr* of the felt sheet 16.

Due to this dimensional difference in the width direction, a compression force Pq2 in the radial width direction is applied to the felt sheet 16 when the cover body 31 and output block body 14 are assembled. When the cover body 31 and the output block body 14 are assembled, the felt sheet 16 is compressed in the radial direction by the compression force Pq2 in the radial width direction. At this time, the compression force Pq2 in the radial width direction shown in FIG. 13 acts uniformly on the felt sheet 16 in the circumferential direction. The circumferential dimensions of the outer circumferential edge 16*tr* and the inner circumferential edge 16*t* of the felt sheet 16 are set so that the compression force Pq2 in the radial width direction acts more strongly on the inner circumferential edge 16*t* than on the outer circumferential edge 16*tr* of the felt sheet 16 in the radial direction.

Thus, the compressed felt sheet 16 prevents the lubricant that has leaked from between the inner circumferential edge 23*t* and the outer circumferential surface 14*d* from further flowing outward. In particular, the sealing property by the felt sheet 16 is stronger at the inner circumferential edge 16*t* than at the outer circumferential edge 16*tr*, due to the intensity of the compression force Pq2 in the radial width direction. More specifically, the compression force Pq2 acts to press and compress the felt sheet 16 locally and strongly at the portion close to the outer circumferential surface 14*d* of the output block body 14 rather than at the portion close to the outer circumferential surface 18*r* of the output outer flange 18. In this way, leakage of the lubricant can be controlled (upstream) before it reaches the upper surface 23*a* of the cover inner flange 23.

In the tenth embodiment, the compression force Pq1 in the axially thickness direction shown in FIG. 13 is not applied to the felt sheet 16. However, the felt sheet 16 can exhibit the sealing property along the outer circumferential surface 14*d* and the upper surface 23*a*. In the tenth embodiment, leakage of lubricant can be controlled before it reaches the lower surface 18*a* (upstream). Thus, the felt sheet 16 may or may not be in contact with the lower surface 18*a*.

The tenth embodiment produces the same advantageous effects as the first embodiment described above.

Eleventh Embodiment

Figure 14:
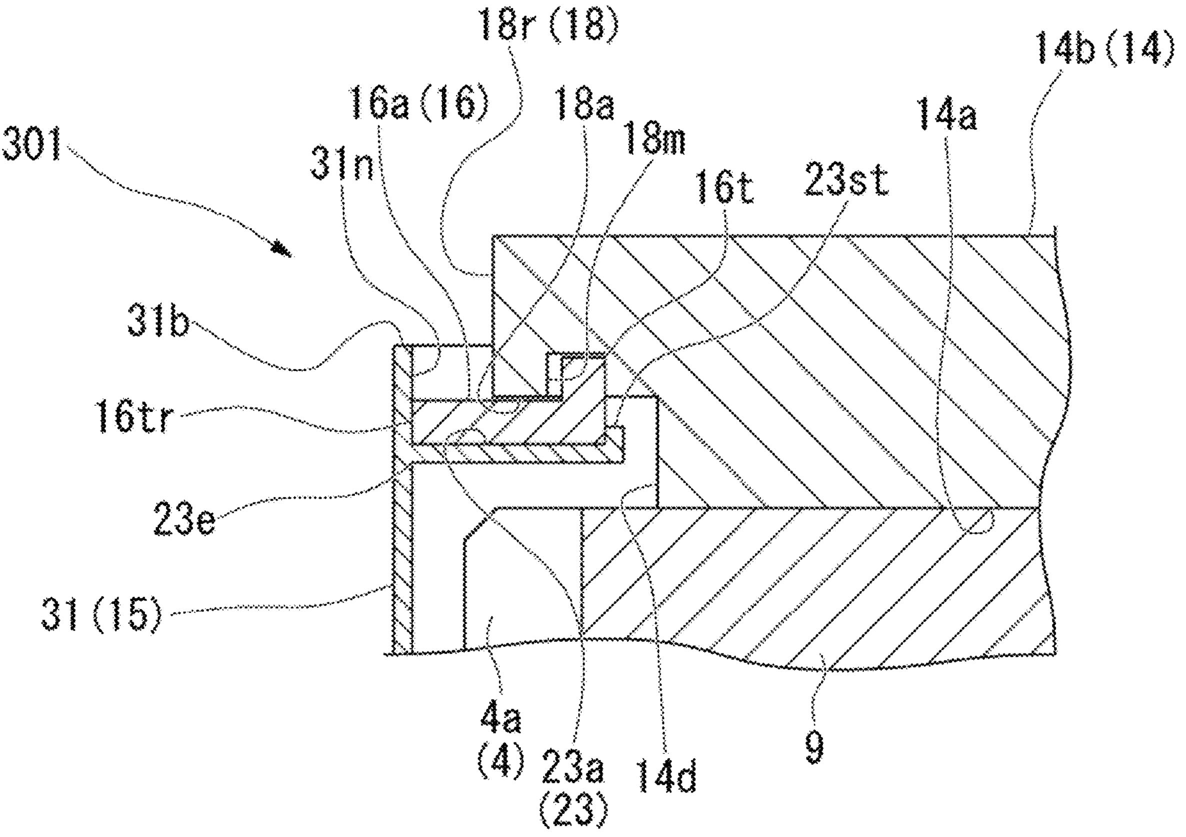
FIG. 14 is an enlarged sectional perspective view of a lubricant leakage control mechanism in an eleventh embodiment of the invention.

The eleventh embodiment of the lubricant leakage control mechanism and gear mechanism is described below with reference to FIG. 14. FIG. 14 is an enlarged sectional view of a positioner, which is a gear mechanism equipped with the lubricant leakage control mechanism 301 relating to the eleventh embodiment.

<Leakage Control Mechanism>

As shown in FIG. 14, the leakage control mechanism 301 has a lower circumferential groove 18*m* (pressing portion) formed in the lower surface 18*a* of the output outer flange 18 as the pressing portion, and a feature similar to the folded end 23*st* (pressing portion) of the sixth embodiment shown in FIG. 8. The leakage control mechanism 301 is not configured to apply the compression force Pq1 in the axial thickness direction to the felt sheet 16 as the pressing portion. The leakage control mechanism 301 is configured to apply the compression force Pq2 in the radial width direction shown in FIG. 13 to the felt sheet 16 at the pressing portion.

The lower circumferential groove 18*m* opens axially downward in the lower surface 18*a*. The lower circumferential groove 18*m* opens at the position facing the upper surface 23*a* of the cover inner flange 23. The lower circumferential groove 18*m* is formed over the entire circumference of the lower surface 18*a* on the radially outer side of the outer circumferential surface 14*d*. The lower circumferential groove 18*m* is formed spaced apart from the outer circumferential surface 14*d* in the radial direction over the entire circumference. The lower circumferential groove 18*m* is formed over the entire circumference of the lower surface 18*a* on the radially inner side of the outer circumferential surface 18*r*. The lower circumferential groove 18*m* is formed spaced apart from the outer circumferential surface 18*r* in the radial direction over the entire circumference.

The lower circumferential groove 18*m* is formed over the entire circumference of the lower surface 18*a*, which is on the radially outer side of the folded end 23*st*. The inner circumferential wall surface of the lower circumferential groove 18*m* is formed at the same position in the radial direction as the outer circumferential wall surface of the folded end 23*st*. In other words, the inner circumferential wall surface of the lower circumferential groove 18*m* aligns with the outer circumferential wall surface of the folded end 23*st* in the axial direction to form a cylindrical surface. The axial separation between the inner circumferential wall surface of the lower circumferential groove 18*m* and the outer circumferential wall surface of the folded end 23*st* is equal to the axial separation between the lower surface 18*a* and the folded end 23*st* in the axial direction.

As long as the inner circumferential wall surface of the lower circumferential groove 18*m* and the outer circumferential wall surface of the folded end 23*st* are aligned, the inner circumferential wall surface of the lower circumferential groove 18*m* and the outer circumferential wall surface of the folded end 23*st* may not extend along the axial direction. In other words, the inner circumferential wall surface of the lower circumferential groove 18*m* and the outer circumferential wall surface of the folded end 23*st* are aligned, and the radial dimension of the upper surface 23*a* may be larger than that of the lower surface 18*a*.

The lower circumferential groove 18*m* has a radial opening width larger than the thickness of the felt sheet 16 in the unassembled state. The radial opening width of the lower circumferential groove 18*m* is not particularly limited provided that it is enough to allow the outer circumferential edge 16*t* of the felt sheet 16 to be inserted therein in the unassembled state.

The inner circumferential edge 16*t* of the felt sheet 16 abuts the upper surface of the lower circumferential groove 18*m*. The outer circumferential edge 16*tr* of the felt sheet 16 abuts the inner circumferential surface 31*n* of the cover body 31. The portion of the felt sheet 16 proximate the outer circumferential edge 16*tr* extends along the upper surface 23*a*. The portion of the felt sheet 16 proximate the outer circumferential end 16*tr* extends radially along the upper surface 23*a*.

The portion of the felt sheet 16 proximate to the inner circumferential edge 16*t* extends along the inner circumferential wall of the lower circumferential groove 18*m* and the outer circumferential wall of the folded end 23*st* in the axial direction. In other words, the felt sheet 16 is curved or bent from the inner circumferential edge 16*t* to the outer circumferential edge 16*tr*. Here, the radial dimension of the felt sheet 16 in the assembled state is the length of the curved or bent felt sheet 16 from the inner circumferential edge 16*t* to the outer circumferential edge 16*tr*.

The lower circumferential groove 18*m* is formed so that its axial depth dimension is set as follows. The axial depth of the lower circumferential groove 18*m* is determined so that the sum of the distance between the upper surface of the lower circumferential groove 18*m* and the upper surface 23*a* and the distance between the base of the folded end 23*st* and the inner circumferential surface 31*n* of the cover body 31 is smaller than the radial dimension of the felt sheet 16 when not assembled. In other words, the sum of the radial dimension of the upper surface 23*a* of the cover inner flange 23, the axial height of the folded end 23*st*, the axial distance between the folded end 23*st* and the lower surface 18*a*, and the axial depth of the lower peripheral groove 18*m* is the compression dimension of the felt sheet 16. This compressed dimension is smaller than the radial dimension of the felt sheet 16 in the unassembled state.

In other words, the sum of the radial distance from the inner circumferential surface 31*n* of the cover body 31 to the outer circumferential surface of the folded end 23*st*, the axial separation distance from the upper surface 23*a* to the lower surface 18*a*, and the axial depth of the lower peripheral groove 18*m* is smaller than the radial dimension of the felt sheet 16 when not assembled.

Due to this dimensional difference, the compression force Pq2 in the radial width direction is applied to the curved or bent felt sheet 16 when the cover body 31 and output block body 14 are assembled. When the cover body 31 and the output block body 14 are assembled, the curved felt sheet 16 is compressed in the radial direction by the compression force Pq2 in the radial width direction. At this time, the compression force Pq2 in the radial width direction shown in FIG. 13 acts uniformly on the curved felt sheet 16 in the circumferential direction. The compression force Pq2 in the radial width direction acts more strongly at the inner circumferential edge 16*t* than at the outer circumferential edge 16*tr* of the curved felt sheet 16 in the radial direction.

Thus, the compressed felt sheet 16 prevents the lubricant that has leaked from between the folded end 23*st* and the outer circumferential surface 14*d* from further flowing outward. In particular, the sealing property by the felt sheet 16 is stronger at the inner circumferential edge 16*t* than at the outer circumferential edge 16*tr*, due to the intensity of the compression force Pq2 in the radial width direction. More specifically, the compression force Pq2 acts to press and compress the felt sheet 16 locally and strongly at the lower circumferential groove 18*m* close to the outer circumferential surface 14*d* of the output block body 14 rather than at the portion close to the outer circumferential surface 18*r* of the output outer flange 18.

Moreover, the compression force Pq2 in the radial width direction acts in the radial direction of the felt sheet 16 in the unassembled state. The compression force Pq2 in the radial direction acts in the axial direction from the upper surface of the lower circumferential groove 18*m* to the inner circumferential edge 16*t* of the felt sheet 16 in the assembled state. At the same time, the area around the inner circumferential edge 16*t* of the felt sheet 16 is curved or bent by the folded end 23*st* and pressed against the upper surface 23*a*.

In other words, the inner circumferential edge 16*t* of the felt sheet 16 is pressed against the upper surface of the lower circumferential groove 18*m* and the curved or bent portion is pressed against the upper surface 23*a*. This allows the felt sheet to exhibit the sealing property in the axial direction covering from the lower surface 18*a* to the upper surface 23*a*. The above-described configuration can inhibit the leakage of lubricant along the upper surface 23*a* and the leakage of lubricant along the lower surface 18*a* simultaneously before the lubricant reaches the upper surface 23*a* of the cover inner flange 23 (upstream).

The eleventh embodiment produces the same advantageous effects as the first embodiment described above.

Twelfth Embodiment

Figure 15:
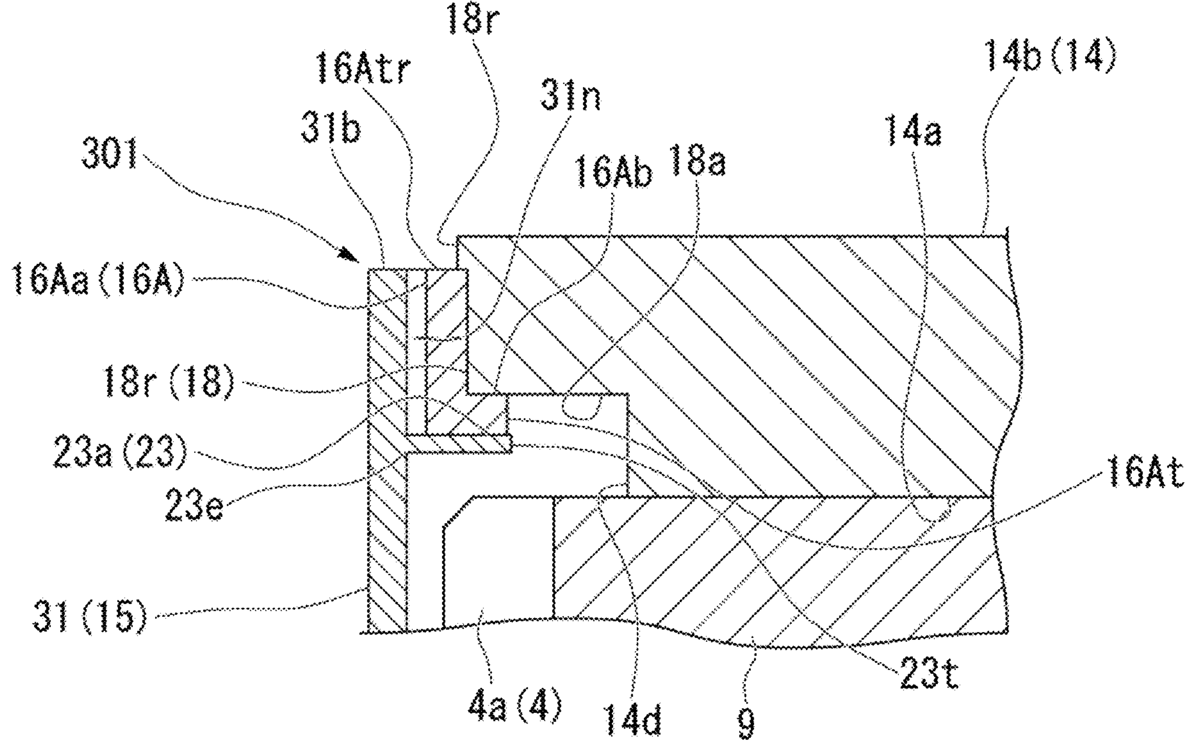
FIG. 15 is an enlarged sectional perspective view of a lubricant leakage control mechanism in a twelfth embodiment of the invention.
Figure 16:
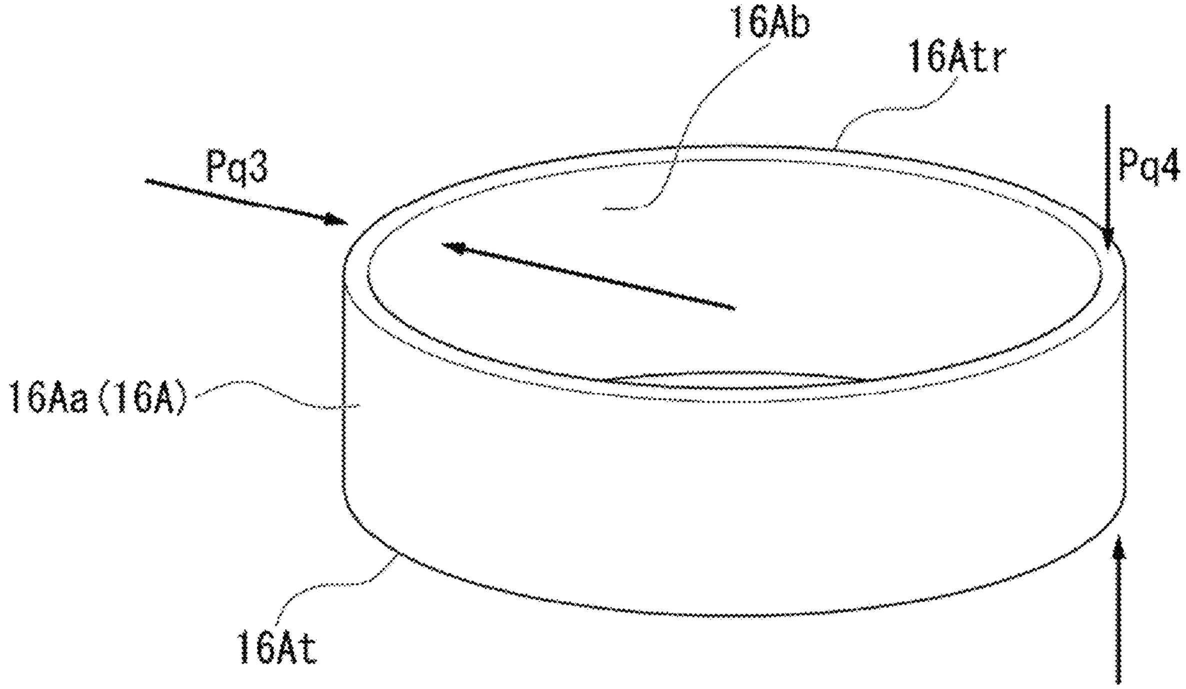
FIG. 16 is a perspective view illustrating a compression direction of a seal member in the lubricant leakage control mechanism in the embodiments of the present invention.

The twelfth embodiment of the lubricant leakage control mechanism and gear mechanism will now be described with reference to FIGS. 15 and 16. FIG. 15 is an enlarged sectional view of a positioner, which is a gear mechanism equipped with the lubricant leakage control mechanism 301 relating to the twelfth embodiment. FIG. 16 is a perspective view illustrating the compression force acting on a felt sheet 16A. The twelfth embodiment differs from the first to eleventh embodiments described above in that it relates to the sealing member and the pressing portion (the same applies to the thirteenth embodiment below).

<Leakage Control Mechanism>

The leakage control mechanism 301 uses a cylindrical felt sheet 16A as the sealing member, as shown in FIGS. 15 and 16. The leakage control mechanism 301 has the outer circumference 18*r* (pressing portion) and the lower surface (pressing portion) 18*a* of the output outer flange 18 as the pressing portions. The felt sheet 16A is made of the same material as the felt sheet 16 in the first through eleventh embodiments described above and is configured to exhibit the equivalent sealing performance.

The felt sheet 16A in its unassembled state has a substantially cylindrical outer shape, as shown in FIG. 16. The felt sheet 16A in the unassembled state may have a cylindrical shape with approximately uniform thickness and approximately equal diameter in the axial direction. The felt sheet 16A in the unassembled state has an axial dimension slightly larger than the axial dimension of the outer circumferential surface 18*r* of the output outer flange 18.

The felt sheet 16A is arranged along the outer circumferential surface 18*r* of the output outer flange 18 as shown in FIG. 15. The felt sheet 16A is fitted along the periphery of the outer circumferential surface 18*r* of the output outer flange 18. An inner circumferential surface 16Ab of the felt sheet 16A contacts the periphery of the outer circumference surface 18*r* of the output outer flange 18. The felt sheet 16A is disposed between the inner circumferential surface 31*n* and the outer circumferential surface 18*r* of the cylindrical cover body 31. The outer circumferential surface 16Aa of the felt sheet 16A may or may not be in contact with the inner circumferential surface 31*n*. For the cylindrical felt sheet 16A, the radial dimension is the thickness, and the axial dimension is the width.

The inner circumferential surface 16Ab of the felt sheet 16A has an inner diameter equal to the outer circumferential surface 18*r* of the output outer flange 18. The felt sheet 16A has the axial dimension larger than the outer circumferential surface 18*r* of the output outer flange 18. One end 16At of the felt sheet 16A projects from the outer circumferential surface 18*r* of the output outer flange 18 toward the upper surface 23*a* of the cover inner flange 23. The other end 16Atr of the felt sheet 16A flushes with the upper end 31*b*, which is the end of the cover body 31, in the axial direction. The other end 16Atr of the felt sheet 16A is fixed to the outer circumferential surface 18*r* of the output outer flange 18.

The other end 16Atr of the felt sheet 16A may be aligned with the upper surface 14*b*, which is the end surface of the output outer flange 18, in the axial direction. The other end 16Atr of the felt sheet 16A may be situated closer to the upper surface 23*a* rather than the upper end 31*b* of the cover body 31, provided that the felt sheet 16A does not extend beyond the upper surface 14*b* in the axial direction and the other end 16Atr situated closer to the upper surface 23*a* rather than the upper surface 14*b*.

A portion including the end 16At of the assembled felt sheet 16A is bent in the direction from the outer circumferential surface 18*r* of the output outer flange 18 to the lower surface 18*a*. The portion including the end 16At of the assembled felt sheet 16A is bent so that the inner circumferential surface 16Ab axially extending in contact with the outer circumferential surface 18*r* bends inwardly in the radial direction to contact the lower surface 18*a*. In the portion including the end 16At of the assembled felt sheet 16A, the felt sheet 16A is bent into an L-shaped cross section. The portion including the end 16At of the assembled felt sheet 16A is bent so that the inner circumferential surface 16Ab axially extending along the outer circumferential surface 18*r* bends inwardly in the radial direction along the lower surface 18*a*.

In the portion including the end 16At of the assembled felt sheet 16A, the outer circumferential surface 16Aa extends in contact with the upper surface 23*a*. The portion including the end 16At of the assembled felt sheet 16A is sandwiched between the lower surface 18Aa and the upper surface 23Aa around the outer circumferential surface 18*r*.

The felt sheet 16A, when bent, is compressed near the boundary between the outer circumferential surface 18*r* and the lower surface 18*a*. In other words, the assembled felt sheet 16A is compressed at the bent portion of the felt sheet 16A. The felt sheet 16A sandwiched between the lower surface 18A and the upper surface 23A near the outer circumferential surface 18*r* is compressed. In this case, a compression force Pq3 in the radial-thickness direction is applied to the felt sheet 16A, as shown in FIG. 16. In other words, the cylindrical felt sheet 16A is compressed in the thickness direction.

The outer circumferential surface 18*r*, the lower surface 18*a*, and the upper surface 23*a* serve as the pressing portions. The inner circumferential surface 31*n* can also serve as the pressing portion. Alternatively, a compression force Pq4 in the axial width direction may be applied to the bent felt sheet 16A. In this way, leakage of the lubricant can be controlled (upstream) before it reaches the inner circumferential surface 31*n* of the cover body 31.

The twelfth embodiment produces the same advantageous effects as the first embodiment described above.

Thirteenth Embodiment

Figure 17:
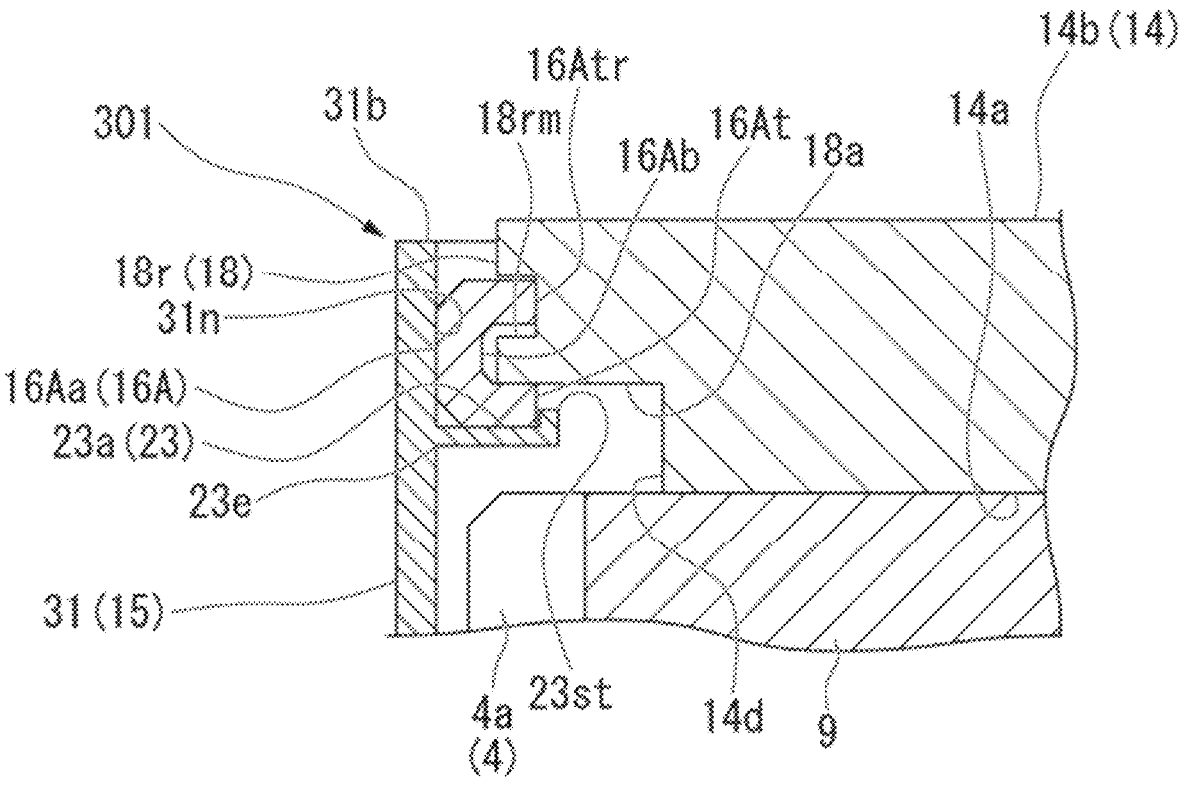
FIG. 17 is an enlarged sectional perspective view of a lubricant leakage control mechanism in a thirteenth embodiment of the invention.

The thirteenth embodiment of the lubricant leakage control mechanism and gear mechanism is described below with reference to FIG. 17. FIG. 17 is an enlarged sectional view of a positioner, which is a gear mechanism equipped with the lubricant leakage control mechanism 301 relating to the thirteenth embodiment. Unlike the twelfth embodiment shown in FIG. 15, the leakage control mechanism 301 is not configured to apply the radial-thickness direction compression force Pq3 to the cylindrical felt sheet 16A at the pressing portions. The leakage control mechanism 301 is configured to apply the compression force Pq4 in the axial width direction as shown in FIG. 16 to the felt sheet 16A at the pressing portions.

<Leakage Control Mechanism>

As shown in FIG. 17, the leakage control mechanism 301 uses the cylindrical felt sheet 16A similar to the twelfth embodiment of FIG. 15 as the sealing member. The leakage control mechanism 301 has an outer circumferential groove 18*rm* (pressing portion) formed in the outer circumferential surface 18*r* of the output outer flange 18 as the pressing portion, in addition to the outer circumferential surface 18*r* (pressing portion) and lower surface 18*a* (pressing portion) of the twelfth embodiment shown in FIG. 15. The leakage control mechanism 301 also has the folded end 23*st* (pressing portion) of the cover inner flange 23.

The outer circumferential groove 18*rm* is formed in the outer circumferential surface 18*r* of the output outer flange 18. The outer circumferential groove 18*rm* opens radially outwardly in the outer circumferential surface 18*r*. The outer circumferential groove 18*rm* opens at a position facing the inner circumferential surface 31*n*. The outer circumferential groove 18*rm* is formed continuously over the entire circumference of the outer circumferential surface 18*r*. The outer circumferential groove 18*rm* is formed in the outer circumferential surface 18*r*, spaced apart from the lower surface 18*a* in the axial direction. The outer circumferential groove 18*rm* is formed in the outer circumferential surface 18*r*, spaced apart from the upper surface 14*b*, which is the end surface of the output outer flange 18, in the axial direction.

The outer circumferential groove 18*rm* is formed closer to the upper surface 23*a* rather than the upper end 31*b* of the cover body 31 in the outer circumferential surface 18*r*. The outer circumferential groove 18*rm* is formed in the outer circumferential surface 18*r*, spaced apart from the upper end 31*b* of the cover body 31. The outer circumferential groove 18*rm* is formed in the outer circumferential surface 18*r* at a position closer to the upper end 31*b* of the cover body 31 rather than the upper surface 23*a*. The outer circumferential groove 18*rm* is formed in the outer circumferential surface 18*r*, spaced apart from the upper surface 23*a*. The opening width dimension of the outer circumferential groove 18*rm*, which is in the axial direction, is larger than the diameter-thickness dimension of the end 16Atr of the felt sheet 16A so that the end 16Atr of the felt sheet 16A is accommodated in the groove.

The end 16Atr of the felt sheet 16A is fitted in the circumferential groove 18*rm*. The end 16Atr of the felt sheet 16A contacts the circumferential lower surface of the circumferential groove 18*rm*. A portion of the felt sheet 16A inside the opening of the circumferential groove 18*rm* and including the end 16Atr of the felt sheet 16A extends radially outward. A portion of the felt sheet 16A proximate the end 16Atr is curved or bent along the inner surface 31*n* and outer circumferential surface 18*r* from the position along the lower inner wall of the outer circumferential groove 18*rm*. The portion of the felt sheet 16A proximate the other end 16Atr is curved or bent from the radial direction to the axial direction from the end 16Atr to the end 16At. A portion of the felt sheet 16A between the one end 16At and the other end 16Atr that is situated on the radially outside of the opening of the circumferential groove 18*rm*, is curved toward the upper surface 23*a*.

A portion of the felt sheet 16A situated on the radially outer side of the outer circumferential surface 18*r* and between the end 16Atr and the end 16At extends axially along the inner circumferential surface 31*n* and the outer circumferential surface 18*r* from the end 16Atr to the end 16At. A portion of the felt sheet 16A proximate to the end 16Atr and situated on the radially outer side of the opening of the outer circumferential groove 18*rm* extends axially along the inner circumferential surface 31*n* to the upper surface 23*a*.

The portion of the felt sheet 16A between the end 16Atr and the end 16At situated on the radially outer side of the opening of the outer circumferential groove 18*rm* abuts the inner circumferential surface 31*n* of the cover body 31 with the outer circumferential surface 16Aa. In the portion where the outer circumferential surface 16Aa of the felt sheet 16A abuts the inner circumferential surface 31*n*, the inner circumferential surface 16Ab of the felt sheet 16A may or may not be in contact with the outer circumferential surface 18*r*. In this manner, the portion of the felt sheet 16A between the one end 16A and the other end 16Atr extends axially along the inner circumferential surface 31*n* of the cover body 31.

The felt sheet 16A is curved from the end 16Atr to the end 16At at the boundary between the outer circumferential surface 18*r* and the lower surface 18*a*. The portion of the felt sheet 16A between the end 16Atr and the end 16At is curved radially inward along the upper surface 23*a*. A portion of the felt sheet 16A proximate the end 16At extends radially inwardly along the upper surface 23*a*. A portion of the felt sheet 16A proximate the end 16At is curved from the axial direction to the radial direction from the 16Atr to the end 16At.

The end 16At of the felt sheet 16A abuts against the outer circumferential surface of the folded end 23*st*. The portion of the felt sheet 16A proximate the end 16At is held between the lower surface 18*a* of the output outer flange 18 and the upper surface 23*a* of the cover inner flange 23.

In other words, the felt sheet 16A is curved inwardly at two points in the direction from the other end 16Atr to the one end 16At. The felt sheet 16A is curved at the two points so that the inner circumferential surface 16Ab has a concave shape. The felt sheet 16A is curved so that its radial and axial sections form substantially C-shapes. Here, the radial width dimension of the felt sheet 16A in the assembled state is the length of the curved or bent felt sheet 16A from the end 16At to the end 16Atr.

The outer circumferential groove 18*rm* is formed so that the length from the circumferential bottom of the outer circumferential groove 18*rm* to the outer circumferential surface of the folded end 23*st* is smaller than the axial width dimension of the felt sheet 16A in the unassembled state. In other words, the radial depth of the outer circumferential groove 18*rm* is the sum of distances measured from the bottom surface of the outer circumferential groove 18*rm*. The distances include the distance from the outer circumferential surface 18*r* of the output outer flange 18 and the inner circumferential surface 31*n* of the cover body 31, and the distance between the creepage distance from the radially outer side of the outer circumferential groove 18*rm* to just above the folded end 23*st*. This sum of the distances is set smaller than the axial width dimension of the felt sheet 16A in the unassembled state.

In other words, the outer circumferential groove 18*rm* is formed so that the C-shaped curved felt sheet 16A has a radial depth that is compressed in the axial width direction compared to the felt sheet 16A in the unassembled state. The radial dimension of the cover inner flange 23 from the outer circumferential edge 23*e* connected to the inner circumferential surface 31*n* to the folded end 23*st* and the axial position of the outer circumferential groove 18*rm* in the outer circumferential surface 18*r* can be considered to configure the felt sheet.

Due to the dimensional difference in the width direction, the compression force Pq4 in the axial width direction is applied to the felt sheet 16A when the cover body 31 and the output block body 14 are assembled. When the cover body 31 and the output block body 14 are assembled, the felt sheet 16A is compressed by the compression force Pq4 in the axial width direction. At this time, the compression force Pq4 in the axial width direction shown in FIG. 16 acts uniformly on the felt sheet 16A in the circumferential direction. The compression force Pq4 in the axial width direction acts with the same strength at the one end 16At and the other end 16Atr of the felt sheet 16A, which are situated at the same position in the radial direction.

When the cover body 31 and the output block body 14 are assembled, the compressive force Pq3 in the radial width direction is applied to the portion of the felt sheet 16A that is curved on the radially outer side of the opening of the circumferential groove 18*rm*. Similarly, the compression force Pq3 in the radial width direction is applied to the portion of the felt sheet 16A that is curved from the inner surface 31*n* to the upper surface 23*a*. When the cover body 31 and the output block body 14 are assembled, the felt sheet 16A is compressed at the two points by the compression force Pq3 in the radial thickness direction. At this time, the compression forces Pq3 in the radial thickness direction shown in FIG. 16 act uniformly on the felt sheet 16A in the circumferential direction. The compression forces Pq3 in the radial thickness direction acts with the same strength at the two curved points because they are curved at the same position in the radial direction.

Thus, the compressed felt sheet 16A prevents the lubricant that has leaked from between the folded end 23*st* and the outer circumferential surface 14*d* from further flowing outward. In particular, the felt sheet is compressed simultaneously at the two points by the compression force Pq4 in the axial width direction and the compression force Pq3 in the radial thickness direction. Thus, the sealing performance of the felt sheet 16A is increased compared to the case of compression only by the compression force Pq4 in the axial width direction or only by the compression force Pq3 in the radial thickness direction. In this way, leakage of the lubricant can be controlled (upstream) before it reaches the upper end 31*b* of the cover body 31.

The seal of the thirteenth embodiment is made by the compression of the curved or bent felt sheet 16A by the compression force Pq4 in the shaft width direction and the compression force Pq3 in the radial thickness direction. This mechanism is different from the leakage control mechanism in which the felt sheet 16A is held between the inner circumferential surface 31*n* of the cover body 31 and the outer circumferential surface 18*r* of the output outer flange 18, which face each other in the radial direction.

The thirteenth embodiment produces the same advantageous effects as the first embodiment described above.

Fourteenth Embodiment

Figure 18:
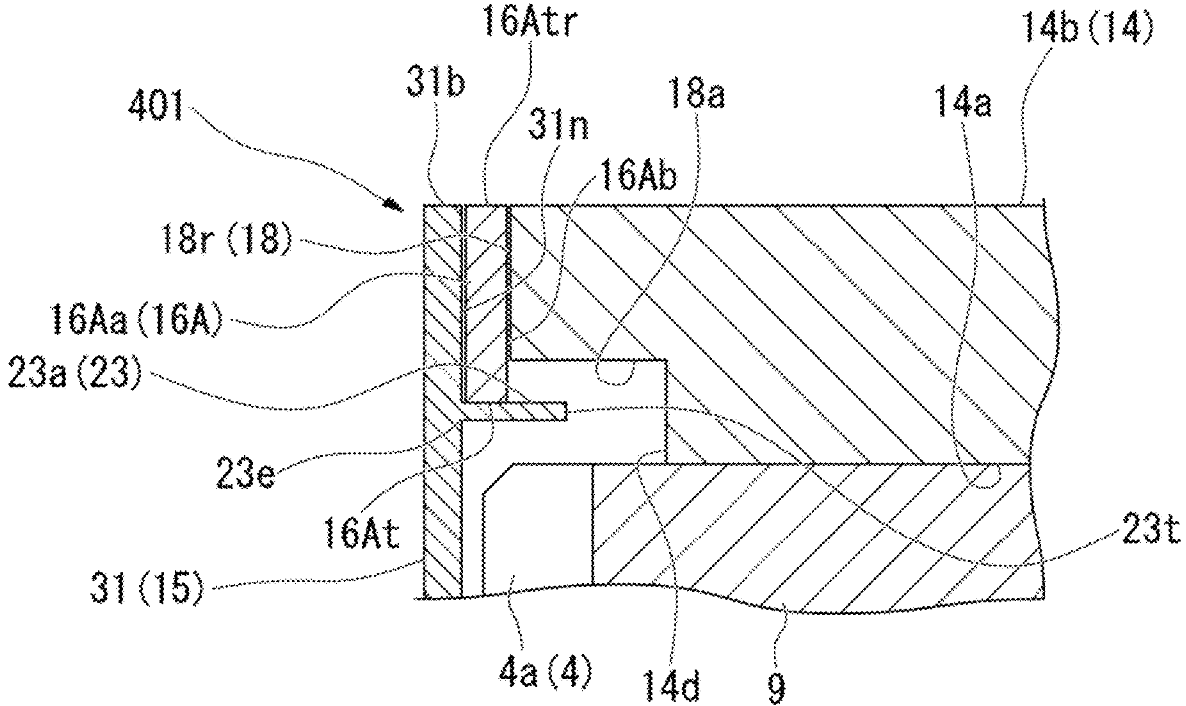
FIG. 18 is an enlarged sectional perspective view of a lubricant leakage control mechanism in a fourteenth embodiment of the invention.

The fourteenth embodiment of the lubricant leakage control mechanism and gear mechanism is described below with reference to FIG. 18. FIG. 18 is an enlarged sectional view of a positioner, which is a gear mechanism equipped with the lubricant leakage control mechanism 401 relating to the fourteenth embodiment. The fourteenth embodiment is different from the above-described first to thirteenth embodiments in terms of the pressed direction of the sheet member.

<Leakage Control Mechanism>

A leakage control mechanism 401 uses a cylindrical felt sheet 16A as the sealing member. The leakage control mechanism 401 has the inner circumferential surface 31*n* of the cover body 31 and the outer circumferential surface 18*r* of the output outer flange 18 facing each other in the radial direction, as shown in FIG. 18. In the leakage control mechanism 401, the felt sheet 16A is held in the radial direction between the inner circumferential surface 31*n* of the cover body 31 and the outer circumferential surface 18*r* of the output outer flange 18. The upper end 31*b* of the cover body 31 is flush with the upper surface 14*b* of the output block body 14 in the axial direction. The end 16Atr of the felt sheet 16A is flush with the upper surface 14*b* of the output block body 14 in the axial direction.

The felt sheet 16A is held between the inner circumferential surface 31*n* of the cover body 31 and the outer circumferential surface 18*r* of the output outer flange 18, and the compression force Pq3 is applied to the felt sheet in the radial-thickness direction. The felt sheet 16A is compressed by the radial-thickness direction compression force Pq3 and exhibits the sealing function. The end 16At of the felt sheet 16A abuts the cover inner flange 23 but the axial width direction compression force Pq4 is not applied to the felt sheet 16A.

The fourteenth embodiment produces the same advantageous effects as the first embodiment described above.

Fifteenth Embodiment

Figure 19:
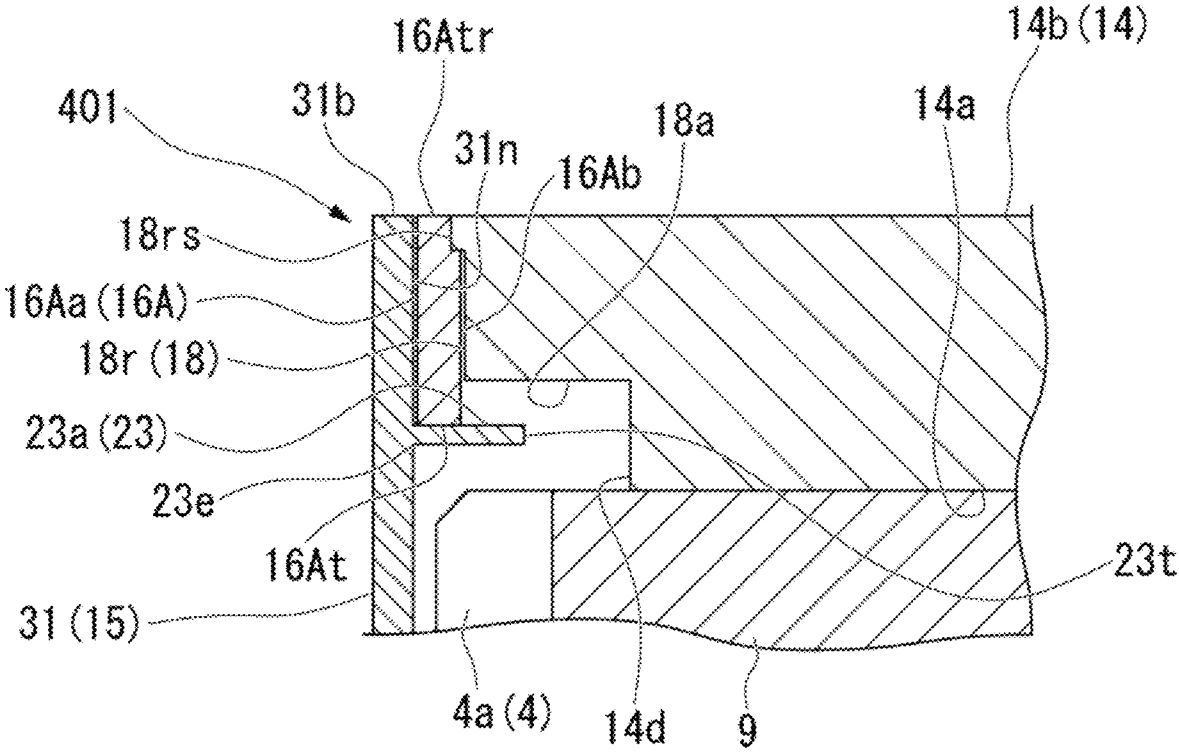
FIG. 19 is an enlarged sectional perspective view of a lubricant leakage control mechanism in a fifteenth embodiment of the invention.

The fifteenth embodiment of the lubricant leakage control mechanism and gear mechanism is described below with reference to FIG. 19. FIG. 19 is an enlarged sectional view of a positioner, which is a gear mechanism equipped with the lubricant leakage control mechanism 401 relating to the fifteenth embodiment. The fifteenth embodiment is different from the fourteenth embodiment in that it has an outer circumferential protrusion 18*rs*.

<Leakage Control Mechanism>

As shown in FIG. 18, the leakage control mechanism 401 uses the cylindrical felt sheet 16A similar to the fourteenth embodiment of FIG. 18 as the sealing member. The leakage control mechanism 401 is formed with the outer circumferential protrusion 18*rs* (pressing portion) as shown in FIG. 19. The outer circumferential protrusion 18*rs* as the pressing portion enhances the sealing between the output block body 14 and the cover 15. Between the output block body 14 and the cover 15, the pressing portion locally presses and compresses the felt sheet 16, which is in surface contact with them.

In the fourteenth embodiment shown in FIG. 18, in the region where the inner surface 31*n* of the cover body 31 and the outer circumferential surface 18*r* of the output outer flange 18 face each other in the horizontal direction of FIG. 18, the radial distance between them is approximately equal in the circumferential and axial directions over the entire length. Whereas in the fifteenth embodiment, the outer circumferential protrusion 18*rs* is provided as shown in FIG. 19, and the axial distance between the inner circumferential surface 31*n* and the outer circumferential surface 18*r* is smaller in the portion where they are in surface contact with the felt sheet 16A. In other words, within the region of the surface contact with the felt sheet 16, the outer circumferential protrusion 18*s* as the pressing portion presses the felt sheet 16A so that the felt sheet is compressed locally more strongly than the other portions of the felt sheet. The outer circumferential protrusion 18*s* compresses the felt sheet 16A more strongly by locally applying the compression force Pq3 in the radially thickness direction shown in FIG. 16.

The outer circumferential protrusion 18*rs* is formed on the outer circumferential surface 18*r* of the output outer flange 18. The outer circumferential protrusion 18*rs* on the outer circumferential surface 18*r* projects radially outward. The outer circumferential projection 18*rs* projects at a position facing the inner circumferential surface 31*n*. The outer circumferential protrusion 18*rs* is formed continuously over the entire circumference of the outer circumferential surface 18*r*. The outer circumferential protrusion 18*rs* is formed on the outer circumferential surface 18*r*, spaced apart from the lower surface 18*a* in the axial direction. The outer circumferential protrusion 18*rs* is formed on the outer circumferential surface 18*r* in contact with the upper surface 14*b*, which is the end surface of the output outer flange 18, in the axial direction. The outer circumferential protrusion 18*rs* may be formed on the outer circumferential surface 18*r*, spaced apart from the upper surface 14*b*, which is the end surface of the output outer flange 18, in the axial direction.

The outer circumferential protrusion 18*rs* is formed on the outer circumferential surface 18*r* at the position near the upper end 31*b* of the cover body 31 and spaced apart from the upper surface 23*a*. The outer circumferential protrusion 18*rs* may be formed on the outer circumferential surface 18*r*, spaced apart from the upper end 31*b* of the cover body 31. The outer circumferential protrusion 18*rs* is formed on the outer circumferential surface 18*r*, spaced apart from the upper surface 23*a*. The outer circumferential protrusion 18*rs* is formed on the outer circumferential surface 18*r* at a position closer to the upper end 31*b* of the cover body 31 rather than the upper surface 23*a*. The outer circumferential protrusion 18*rs* may be formed on the outer circumferential surface 18*r* at a position closer to the upper surface 23*a*.

The outer circumferential protrusion 18*rs* may have a continuous inclined surface from its top to the outer circumferential surface 18*r* of the output outer flange 18. The outer circumferential protrusion 18*rs* may have an annular surface vertically extending from its top to the outer circumferential surface 18*r* of the output outer flange 18 in the radial direction. The outer circumferential protrusion 18*rs* is formed such that the top of the protrusion 18*rs* has an R surface. The R surface at the top of the outer circumferential protrusion 18*rs* is a curved surface having a radius of curvature in the radial section. The top of the outer circumferential protrusion 18*rs* is also formed to be smooth in the circumferential direction.

The radial distance between the top of the outer circumferential protrusion 18*rs* and the inner circumferential surface 31*n* of the cover body 31 is smaller than the thickness of the felt sheet 16A measured in the unassembled state. At a position different from the outer circumferential protrusion 18*rs* in the circumferential direction, the radial distance between the output outer flange 18 and the inner circumferential surface 31*n* of the cover body 31 may be smaller or slightly larger than the thickness of the felt sheet 16 measured in the unassembled state.

The felt sheet 16A is held between the inner circumferential surface 31*n* of the cover body 31 and the outer circumferential surface 18*r* of the output outer flange 18, and the compression force Pq3 is applied to the felt sheet in the radial-thickness direction as shown in FIG. 16. The felt sheet 16A is compressed by the radial-thickness direction compression force Pq3 and exhibits the sealing function. The felt sheet 16A is locally subjected to the large radial compression force Pq3 in the radial direction by the outer circumferential protrusion 18*rs*. The felt sheet 16A is locally compressed in the radial direction by the outer circumferential protrusion 18*rs*.

Thus, the lubricant used for meshing of the small gear 27 with the annular gear 4 is inhibited from flowing along the outer surface 14*d* of the output block body 14 in the axial direction from the immediate vicinity (directly above) of the annular gear 4. Further, the lubricant moving radially outward along the lower surface 18*a* of the output outer flange 18 and moving axially upward along the outer circumferential surface 18*r* of the output outer flange 18 is inhibited. At the same time, the lubricant is inhibited from flowing from the immediate vicinity (directly above) of the annular gear 4 to axially upward between the outer circumferential surface 18*r* of the output outer flange 18 and the inner circumferential surface 31*n* of the cover body 31.

The outer circumferential protrusion 18*rs* prevents the lubricant from soaking into the felt sheet 16A and leaking outward. In other words, the outer circumferential protrusion 18*rs* stops the lubricant leaking toward the outside by compressing the felt sheet 16 more strongly and locally. The end 16At of the felt sheet 16A abuts the cover inner flange 23 but the axial width direction compression force Pq4 shown in FIG. 16 is not applied to the felt sheet 16A.

The fifteenth embodiment produces the same advantageous effects as the first embodiment described above.

Sixteenth Embodiment

Figure 20:
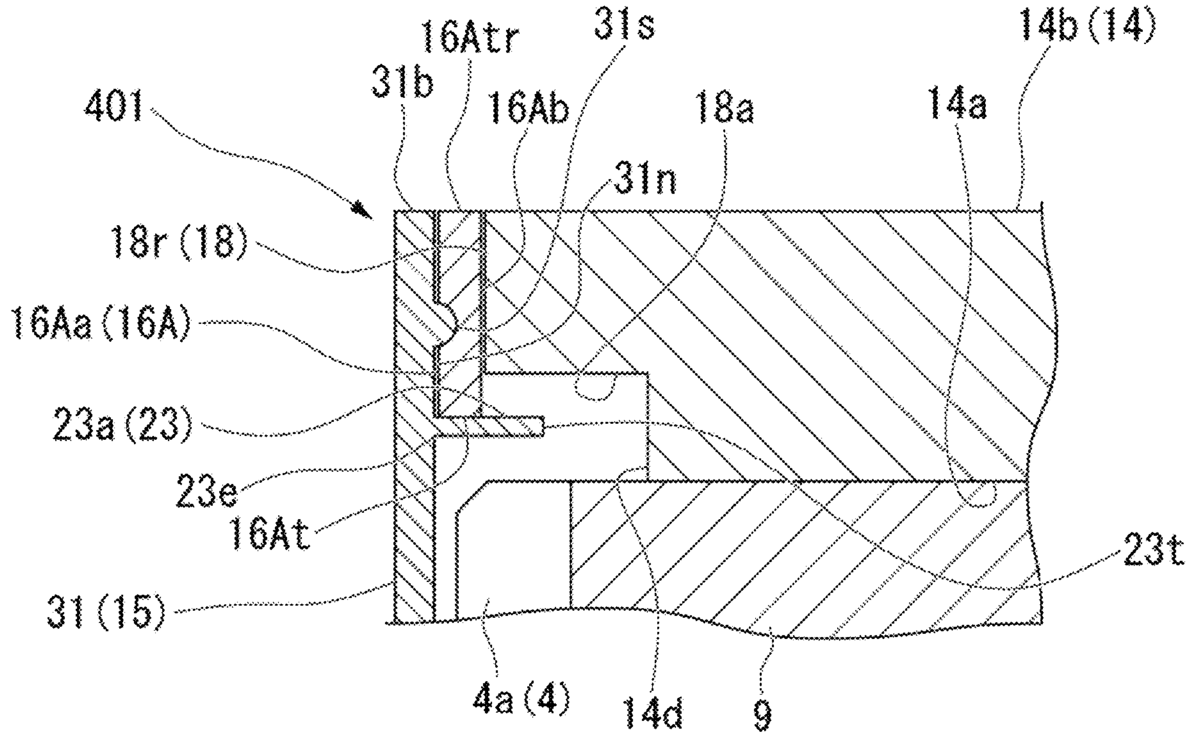
FIG. 20 is an enlarged sectional perspective view of a lubricant leakage control mechanism in a sixteenth embodiment of the invention.

The sixteenth embodiment of the lubricant leakage control mechanism and gear mechanism is described below with reference to FIG. 20. FIG. 20 is an enlarged sectional view of a positioner, which is a gear mechanism equipped with the lubricant leakage control mechanism 401 relating to the sixteenth embodiment. The sixteenth embodiment is different from the fourteenth embodiment in that it has inner circumferential ball projection portions 31*s*.

<Leakage Control Mechanism>

As shown in FIG. 20, the leakage control mechanism 401 is equipped with inner circumferential ball projection portions 31*s* (pressing portions) as a convex shape that serves as the pressing portion. The inner circumferential ball projection portions 31*s* as the pressing portion press the felt sheet 16A so that the felt sheet is compressed locally more strongly than the other portions of the felt sheet. The inner circumferential ball projection portions 31*s* compress the felt sheet 16A more strongly by locally applying the compression force Pq3 shown in FIG. 16, in the radial thickness direction. The inner circumferential ball projection portions 31*s* are each formed to project radially inward from the inner circumferential surface 31*n* of the cover body 31 toward the outer circumferential surface 18*r* of the output outer flange 18. The inner circumferential ball projection portions 31*s* are arranged at intervals in the circumferential direction on the cover body 31 over the entire circumference of the flange 23 in the radial direction.

One inner circumferential ball projection portion 31*s* is formed in a hemispherical shape that projects radially inward from the inner circumferential surface 31*n* of the cover body 31 toward the outer circumferential surface 18*r* of the output outer flange 18. In other words, the inner circumferential ball projection portions 31*s* as the pressing portion are each formed to have the top with a curved surface. The curved surface here is smooth in both the circumferential and radial directions. The plurality of the inner circumferential ball projection portions 31*s* may all be formed so that they have the same radial height protruding from the inner circumferential surface 31*n* of the cover body 31. The plurality of the inner circumferential ball projection portions 31*s* are all formed to have substantially the same outer profile on the inner circumferential surface 31*n* of the cover body 31. Specifically, they can be formed in the same shape like a welding ball on the inner circumferential surface 31*n* of the cover body 31.

The tops of all of the plurality of inner circumferential ball projection portions 31*s* are arranged at the same axial position. The positions of the tops of the inner circumferential ball projection portions 31*s* may be slightly different in the axial direction as long as they are within a predetermined range. The tops of the inner circumferential ball projection portions 31*s* are situated below the upper end 31*b* of the cover body 31 in the axial direction. The tops of the inner circumferential ball projection portions 31*s* are situated above the lower surface 18*a* of the output outer flange 18 in the axial direction. The tops of the inner circumferential ball projection portions 31*s* are situated on the axially above the one end 16At of the felt sheet 16A. The inner circumferential ball projection portions 31*s* are formed in the region in the axial direction where they face the outer circumferential surface 18*r* of the output outer flange 18.

The plurality of inner circumferential ball projection portions 31*s* all apply a locally large compression force Pq3 in the radial thickness direction to the felt sheet 16A. The felt sheet 16A is more strongly and locally compressed by the plurality of inner circumferential ball projection portions 31*s*. This stops the lubricant leaking toward the outside. Leakage of lubricant can be efficiently controlled in the immediate vicinity of the annular gear 4. The inner circumferential ball projection portions 31*s* are arranged at intervals in the circumferential direction and serve as a stopper for the felt sheet 16A that tends to slide between the output outer flange 18 and the cover body 31.

Specifically, the cover body 31 and the felt sheet 16A do not slide, but the output outer flange 18 and the felt sheet 16A slide. This can efficiently prevent the leakage of the lubricant flowing radially outward along the inner circumferential surface 31*n* of the cover body 31. The inner circumferential ball projection portions 31*s* are formed integrally with the cover body 31 so that it is possible to improve the sealing performance while reducing the number of parts. The inner circumferential ball projection portions 31*s* can be formed more easily than the outer circumferential protrusion 18*rs* of the fifteenth embodiment shown in FIG. 19. Therefore, the manufacturing process can be facilitated, and the manufacturing cost can be reduced.

In the sixteenth embodiment, the inner circumferential ball projection portions 31*s* are arranged at intervals in the circumferential direction. Alternatively, the inner circumferential ball projection portions 31*s* can also be formed on the inner circumferential surface 31*n* of the cover body 31 as a continuous circumferential protrusion. In this case, the protrusion compresses the felt sheet 16A as the pressing portion to inhibit the lubricant from moving axially upward and outward from between the inner circumferential surface 31*n* of the cover body 31 and the outer circumferential surface 18*r* of the output outer flange 18. In this case, the top of the protrusion as the pressing portion is preferably formed in a rounded or smoothed shape even in the circumferential direction so that it does not catch the felt sheet 16A and tear the felt sheet 16A.

The sixteenth embodiment produces the same advantageous effects as the first embodiment described above.

Seventeenth Embodiment

Figure 21:
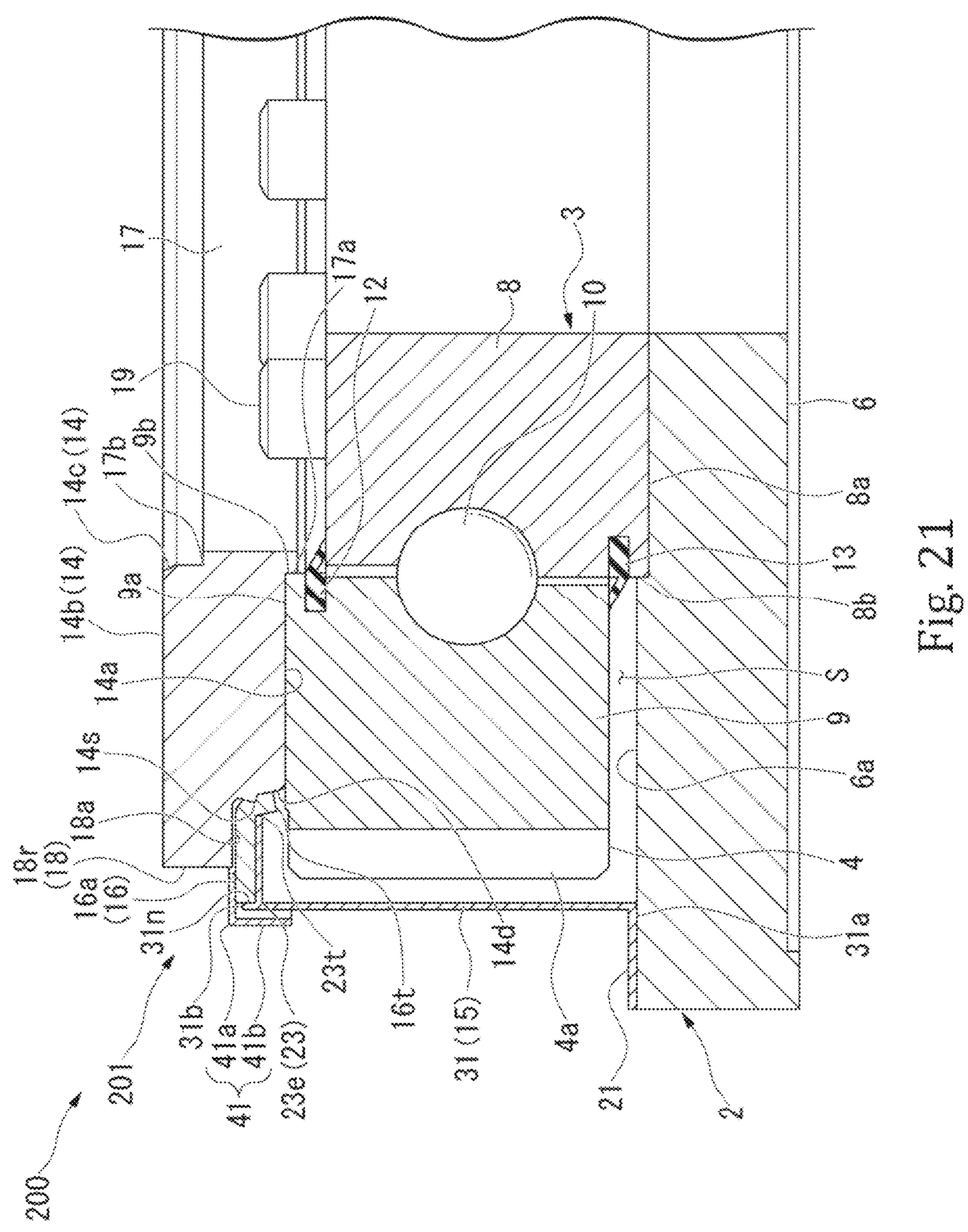
FIG. 21 is an enlarged sectional perspective view of a lubricant leakage control mechanism in a seventeenth embodiment of the invention.

The seventeenth embodiment of the lubricant leakage control mechanism and gear mechanism is described below with reference to FIG. 21. FIG. 21 is an enlarged sectional view of a positioner, which is a gear mechanism equipped with the lubricant leakage control mechanism 201 relating to the seventeenth embodiment. The seventeenth embodiment is different from the second embodiment in terms of the pressing portion.

<Leakage Control Mechanism>

As shown in FIG. 21, the leakage control mechanism 201 is equipped with an outer circumferential protrusion 14*s* (pressing portions) as a convex shape that serves as the pressing portion. The outer circumferential protrusion 14*s* is formed on the outer circumferential surface 14*d* of the output block body 14. The outer circumferential protrusion 14*s* projects radially outwardly on the outer circumferential surface 14*d*. The outer circumferential protrusion 14*s* projects at a position facing the inner circumferential edge 23*t* of the cover inner flange 23. The outer circumferential protrusion 14*s* is formed continuously over the entire circumference of the outer circumferential surface 14*d*. The outer circumferential protrusion 14*s* is formed on the outer circumferential surface 14*d*, spaced apart from the lower surface 18*a* in the axial direction. The outer circumferential protrusion 14*s* formed on the outer circumferential surface 14*d* is spaced apart from the lower surface 14*a* of the output block body 14 in the axial direction. The outer circumferential protrusion 14*s* on the outer circumferential surface 14*d* is spaced apart from the surface 9*a* of the outer ring 9 in the axial direction.

The inner circumferential portion 16*b* of the felt sheet 16 extends along the outer circumferential surface 14*d* of the output block body 14 to near the surface 9*a* of the outer ring 9. In other words, the inner circumferential portion 16*b* of the felt sheet 16 is bent by the outer circumferential surface 14*d* of the output block body 14 toward the outer ring 9, using the inner circumferential edge 23*t* of the cover inner flange 23 as a pivot point. At the same time, the inner circumference portion 16*b* of the felt sheet 16 is pressed toward the inner circumferential edge 23*t* of the cover inner flange 23 by the outer circumferential protrusion 14*s* on the outer circumferential surface 14*d*. In other words, the outer circumferential protrusion 14*s* strongly compresses the felt sheet 16 by locally applying the axial thickness direction compression force Pq1 shown in FIG. 13 to the curved felt sheet 16.

The felt sheet 16 is pressed more strongly at the portion held between the outer circumferential protrusion 14*s* and the inner circumferential edge 23*t* than at the other portions of the felt sheet 16. The felt sheet 16 is compressed more strongly by the axial thickness direction compression force Pq1 at the portion held between the outer circumferential protrusion 14*s* and the inner circumferential edge 23*t* than at the other portions of the felt sheet. This allows the felt sheet 16 to present a higher sealing performance that prevents the lubricant from leaking outward from the inside to the outside in the radial direction than if there were no pressing portions.

This felt sheet 16 is not only held in the axial direction by the cover inner flange 23 and the output outer flange 18, but is also held and supported in the axial direction by the outer circumferential protrusion 14*s* and the inner circumferential edge 23*t*. This prevents the felt sheet 16 itself from being rotated against the cover body 31 and output block body 14 (output outer flange 18). The upper surface 16*a* of the felt sheet 16 is completely covered by the transverse wall 41*a*. This more reliably prevents leakage of the lubricant used for the meshing of the small gear 27 with the annular gear 4 in the immediate vicinity (directly above) of the annular gear 4, and also prevents dust from entering inside the cover 15 from the outside.

The seventeenth embodiment produces the same advantageous effects as the first embodiment described above.

The embodiments described herein are not intended to necessarily limit the present invention to any specific embodiments. Various modifications can be made to these embodiments without departing from the true scope and spirit of the present invention. For example, the configuration of the first embodiment described above may be combined with the configuration of the second embodiment described above. For example, the inner circumferential portion 16*b* of the felt sheet 16 of the above first embodiment may be pressed by the outer circumferential surface 14*d* of the output block body 14 to be disposed in the gap between the cover inner flange 23 and the outer circumferential surface 14*d* of the output block body 14.

In the embodiments described above, the leakage control mechanism 1 is applied to the positioner 100 used in construction machinery, industrial machinery and the like. However, the invention is not limited to this, and the leakage control mechanism 1 can be applied to various gear mechanisms other than the positioner 100. For example, the leakage control mechanism 1 can be applied to a mechanism in which spur gears are meshed with each other.

For example, the leakage control mechanism 1 can be applied even when the annular gear 4 has internal teeth instead of the external teeth 4*a*. In this case, the cover body 31 of the cover 15 can be formed such that it faces the internal gear in the radial direction and covers the internal gear over its entire circumference. The shape of the output block body 14 is also not limited to the above described ones. The output block body 14 can be made in any shapes provided that it has the outer circumferential surface 14*d*. When the cover body 31 is disposed on the inner circumferential surface (internal tooth) of the annular gear 4, the output block body 14 also has an inner circumferential surface. The sealing member seals between this inner circumferential surface and the cover body 31.

The above embodiment describes the case where the felt sheet 16 is provided as the sealing member to seal between the output block body 14 and the cover 15. The present invention, however, is not limited to such, and various sealing members can be used. For example, oil seals, O-rings, rubber gaskets, etc. can be used instead of the felt sheet 16. These sealing members can also be used in combination. For example, the felt sheet 16 and an O-ring can be used together. In this case, the O-ring and the felt sheet 16 are placed in a position where they are held between the cover inner flange 23 and the output outer flange 18. In such a configuration, the O-ring is slightly compressed and allows the O-ring to be used more effectively.

The above embodiment describes the case where the cover 15 has the cover inner flange 23 integrally formed with the cover 15 and the output block body 14 has the output outer flange 18 integrally formed with the output block body. However, the invention is not limited to this case, and at least one of the cover inner flange 23 or the output outer flange 18 may be formed. The felt sheet 16 does not have to be held in the axial direction. For example, the inner circumferential edge of the cover inner flange 23 may extend in the axial direction, and the felt sheet 16 or other sealing material may be held between this extending edge and the outer surface 14*d* of the output block body 14.

The method of forming the cover inner flange 23 and the output outer flange 18 is not particularly limited. In the above embodiments, the cover inner flange 23 is formed by jointing to the cover body 31 by welding, for example. However, the invention is not limited to this, and the cover inner flange 23 may be formed by bending the cover body 31 inward in the radial direction and then folding it back outward in the radial direction.

The above embodiments describe the case where the output block body 14 is provided on one side (surface 9*a* of the outer ring 9) of the annular gear 4, which is the gear. However, the invention is not limited to this, and the output block body 14 (block body) may be provided on both sides of the gear. In this case, for example, the cover body 31 is configured to be divisible in the thickness direction of the gear. In this configuration, the leakage control mechanism 1 (cover inner flange 23) can be easily provided on both sides of the gear.

In the above embodiments, the case in which the speed reducer 25 is an eccentric oscillation speed reducer have been described. However, the invention is not limited to this, and various speed reducers can be applied. For example, a planetary gear speed reducer can be applied instead of the eccentric oscillation speed reducer.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

For example, the configurations of the above embodiments may be selected as appropriate and combined with the configuration of the other embodiments individually. For example, in a configuration using the annular-plate like felt sheet 16 as the sealing member, elements selected from among the protrusion 18_s_, the ring groove 18_m_ and O-ring 18_o_, the ball projection portions 23_s_, folded end 23_st_, inclined surface 18_as_, cover inner inclined flange 23A, outer circumferential groove 14_m_, lower circumferential groove 18_m_, and outer circumferential protrusion 14_s_ may be combined appropriately to compress the felt sheet 16 and improve the sealing of the lubricant leaking outward from between the cover body 31 and the output block body 14.

Alternatively, in the configuration in which the cylindrical felt sheet 16A is used as the sealing member, elements selected from among those of the twelfth, thirteenth, fourteenth, fifteenth and sixteenth embodiments may be combined as appropriate to compress the felt sheet 16A by the compression force Pq4 in the axial width direction and the compression force Pq3 in the radial thickness direction.

INDUSTRIAL APPLICABILITY

With the above-described lubricant leakage control mechanism and gear mechanism, leakage of the lubricant supplied to the meshing of gears in the vicinity of the gears can be controlled, thereby reducing the size of the equipment.

LIST OF REFERENCE NUMBERS

1, 201, 301 . . . lubricant leakage control mechanism, 4 . . . annular gear (gear), 4_a_ . . . external teeth (teeth), 9 . . . outer ring, 9_a_ . . . one surface, 14 . . . output block body (block body) 14_d_ . . . outer circumferential surface (circumferential surface), 15 . . . cover, 16, 16_a_ . . . felt sheet (sealing member, porous material), 18 . . . output outer flange (block body overhang), 18_s_ . . . protrusion (pressing portion), 18_m_ . . . ring groove (pressing portion), 18_o_ . . . . O-ring (pressing portion), 23_s_ . . . ball projection portions (pressing portion), 23_st_ . . . folded end (pressing portion), 18_as_ . . . inclined surface (pressing portion), 23A . . . cover inner inclined flange (pressing portion), 14_m_ . . . outer circumferential groove (pressing portion), 18_m_ . . . lower circumferential groove (pressing portion), 14_s_ . . . outer circumferential protrusion (pressing portion), 18_rs_ . . . outer circumferential protrusion (pressing portion), 31_s_ . . . inner circumferential ball projection portions (pressing portion), 23 . . . cover inner flange (cover overhang), 31 . . . cover body (cover), 41 . . . auxiliary cover, 100 . . . positioner (gear mechanism)

What is claimed is:

1. A lubricant leakage control mechanism comprising:

a block body disposed adjacent to teeth of a gear in a thickness direction of the gear and, the block body having a circumferential surface around its entire circumference;

a cover provided around an entire circumference of the gear so as to face the teeth in a radial direction of the gear, the cover covering the teeth; and a sealing member for preventing leakage of lubricant from between the block body and the cover, wherein the block body is disposed on at least one of two opposing surfaces of the gear in the thickness direction, wherein the sealing member includes a porous material that is compressible and deformable, wherein the block body has a block body overhang projecting from the circumferential surface toward the cover, and wherein the sealing member is disposed between the block body overhang and the cover.

2. The lubricant leakage control mechanism of claim 1, wherein the cover has a cover overhang projecting from the cover toward the gear teeth, and wherein the sealing member is disposed between the cover overhang and the block body.

3. The lubricant leakage control mechanism of claim 1, wherein the cover has a cover overhang projecting from the cover toward the teeth, and wherein the sealing member is held in the thickness direction by the cover overhang and the block body overhang.

4. The lubricant leakage control mechanism of claim 1, wherein the sealing member is in surface contact with the block body and the cover.

5. The lubricant leakage control mechanism of claim 4, further comprising a pressing portion provided on at least one of the block body or the cover, the pressing portion locally pressing the sealing member against the block body or the cover.

6. The lubricant leakage control mechanism of claim 5, wherein the pressing portion is formed continuously or discontinuously in the circumferential direction of the gear.

7. The lubricant leakage control mechanism of claim 6, wherein the pressing portion presses the sealing member in the radial direction of the gear or in the thickness direction of the gear.

8. The lubricant leakage control mechanism of claim 7, wherein the pressing portion is formed to be convex or concave in the direction of pressing the sealing member.

9. The lubricant leakage control mechanism of claim 8, wherein the pressing portion is formed to be convex or concave in the direction of pressing the sealing member, and a top of the pressing portion is rounded.

10. The lubricant leakage control mechanism of claim 7, wherein the pressing portion is formed so that a distance between the opposing surfaces of the block body and the cover is decreased.

11. A lubricant leakage control mechanism comprising:

a block body disposed adjacent to teeth of a gear in a thickness direction of the gear and, the block body having a circumferential surface around its entire circumference;

a cover provided around an entire circumference of the gear so as to face the teeth in a radial direction of the gear, the cover covering the teeth; and a sealing member for preventing leakage of lubricant from between the block body and the cover, wherein the block body is disposed on at least one of two opposing surfaces of the gear in the thickness direction, wherein the sealing member includes a porous material that is compressible and deformable, wherein the cover includes:

a cover overhang projecting from the cover toward the teeth; and an auxiliary cover provided at a position more distant from the gear in the thickness direction than the cover overhang, and wherein the sealing member is held in the thickness direction by the cover overhang and the auxiliary cover.

12. The lubricant leakage control mechanism of claim 11, wherein the sealing member is disposed between the cover overhang and the circumferential surface of the block body.

* * * * *